(12) United States Patent
Ciklaiblikci et al.

(10) Patent No.: US 12,283,871 B2
(45) Date of Patent: Apr. 22, 2025

(54) ELECTRICITY GENERATING SYSTEM WITH GRAVITY FORCE

(71) Applicant: Suleyman Tuna Han Tasci, Kayseri (TR)

(72) Inventors: Ilhan Kurtulus Ciklaiblikci, Kayseri (TR); Yasin Bahadir Ciklaiblikci, Kayseri (TR); Taha Faruk Ciklaiblikci, Kayseri (TR)

(73) Assignee: Suleyman Tasci, Kayseri (TR)

( * ) Notice: Subject to any disclaimer, the term of this patent is extended or adjusted under 35 U.S.C. 154(b) by 323 days.

(21) Appl. No.: 17/790,309

(22) PCT Filed: Dec. 31, 2019

(86) PCT No.: PCT/TR2019/051272
§ 371 (c)(1),
(2) Date: Jun. 30, 2022

(87) PCT Pub. No.: WO2021/137778
PCT Pub. Date: Jul. 8, 2021

(65) Prior Publication Data
US 2023/0085576 A1 Mar. 16, 2023

(51) Int. Cl.
*H02K 7/18* (2006.01)
*H02K 7/116* (2006.01)
(Continued)

(52) U.S. Cl.
CPC .......... *H02K 7/1853* (2013.01); *H02K 7/116* (2013.01); *H02K 11/0094* (2013.01);
(Continued)

(58) Field of Classification Search
CPC .. H02K 7/1853; H02K 7/116; H02K 11/0094; H02K 11/21; H02K 13/003;
(Continued)

(56) References Cited

U.S. PATENT DOCUMENTS 9,136,749 B1 * 9/2015 Callier .................. H02K 35/02

FOREIGN PATENT DOCUMENTS

| KR | 101036255 B1 * | 6/2011 | |
| WO | WO-2011105959 A1 * | 9/2011 | ............. B66B 1/302 |
| WO | WO-2018070965 A2 * | 4/2018 | ................ F02C 1/00 |

OTHER PUBLICATIONS

KR101036255B1 English translation (Year: 2024).*

* cited by examiner

*Primary Examiner* — Christopher M Koehler
*Assistant Examiner* — Viswanathan Subramanian
(74) *Attorney, Agent, or Firm* — Koivula & Somersalo, LLC

(57) ABSTRACT

Power plant having generator with stator and rotor rotating in opposite directions and comprising rotor generator linear gear and stator generator linear gear positioned in opposite directions to one another relatively to generator axis consisting of rotor shaft and stator shaft, rotor generator impeller and stator generator impeller in contact with rotor generator linear gear and stator generator linear gear, and have rotational motion in opposite directions, at least one carrying motor allowing lifting the mechanism up by motor linear gear, sensor groups detecting location of the mechanism, battery and/or power supply and/or electricity grid providing electrical energy for the system, brush-slip ring system and mechanism phase output for drawing out electricity generated in said generator, a control unit controlling accelerating, decelerating and stopping actions of said mechanism of which location is detected by mechanism phase output and sensor groups and carrying motor and motor drive circuit preforming said actions.

17 Claims, 30 Drawing Sheets

(51) Int. Cl.
*H02K 11/00* (2016.01)
*H02K 11/21* (2016.01)
*H02K 13/00* (2006.01)
*H02K 16/02* (2006.01)
*H02K 21/24* (2006.01)

(52) U.S. Cl.
CPC ........... *H02K 11/21* (2016.01); *H02K 13/003* (2013.01); *H02K 16/02* (2013.01); *H02K 21/24* (2013.01)

(58) Field of Classification Search
CPC .......... H02K 16/02; H02K 21/24; H02K 7/06; H02K 16/00; H02K 16/005; H02K 7/1807; H02K 53/00; B60Y 2200/92
See application file for complete search history.

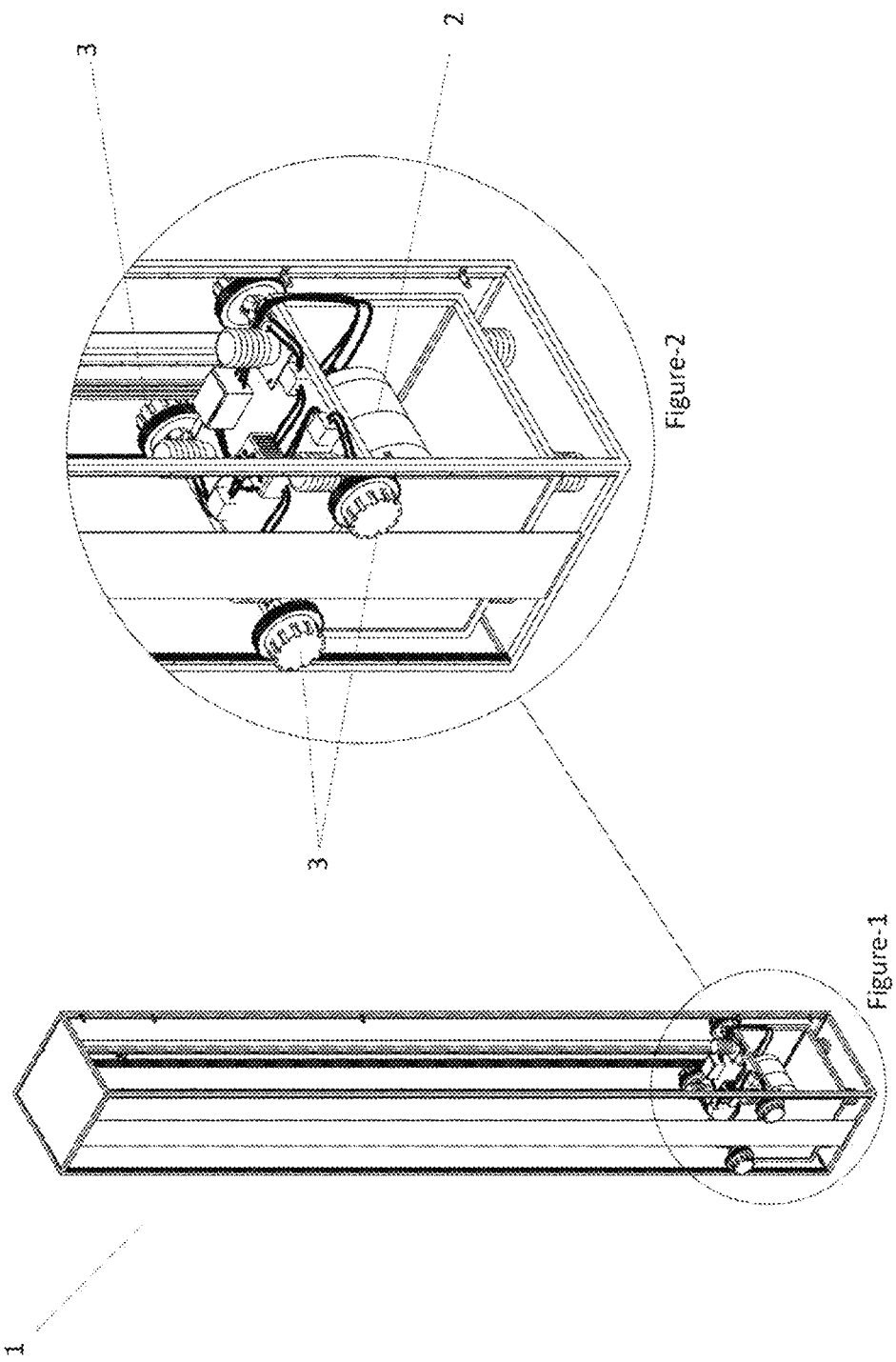

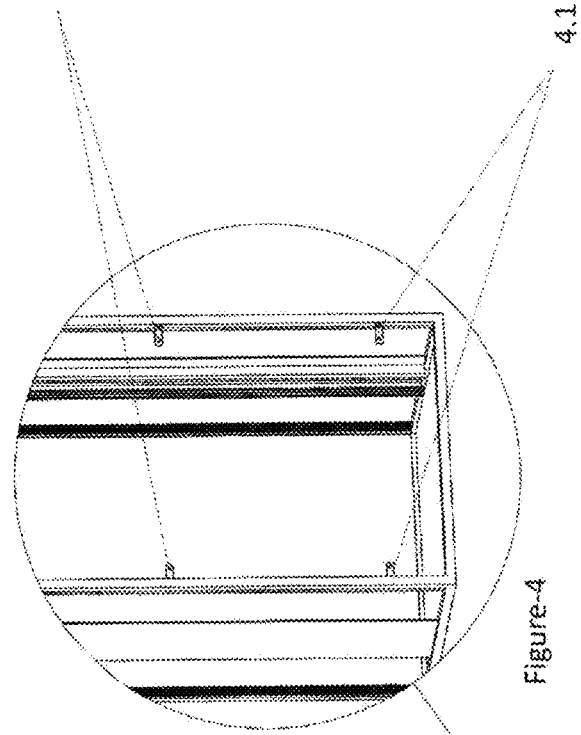
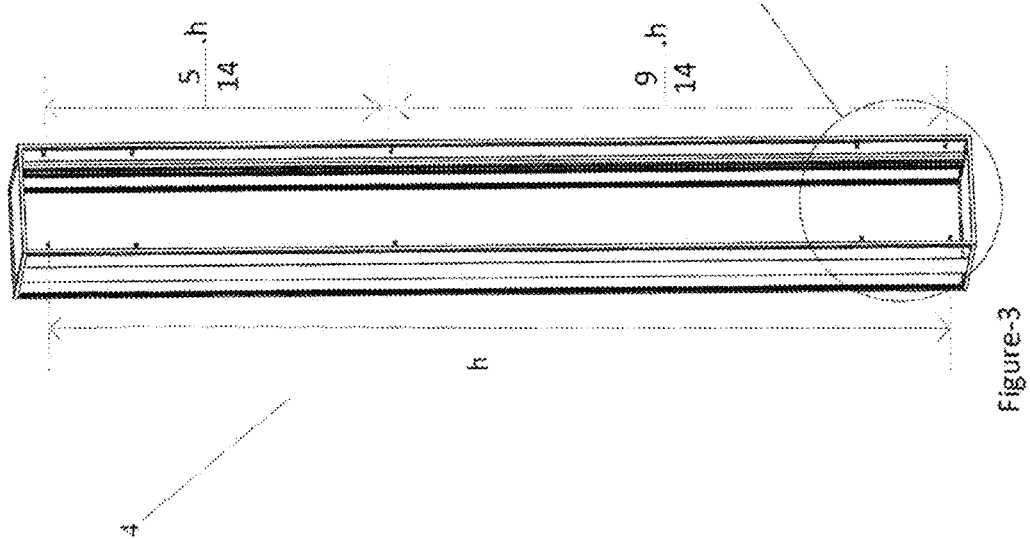

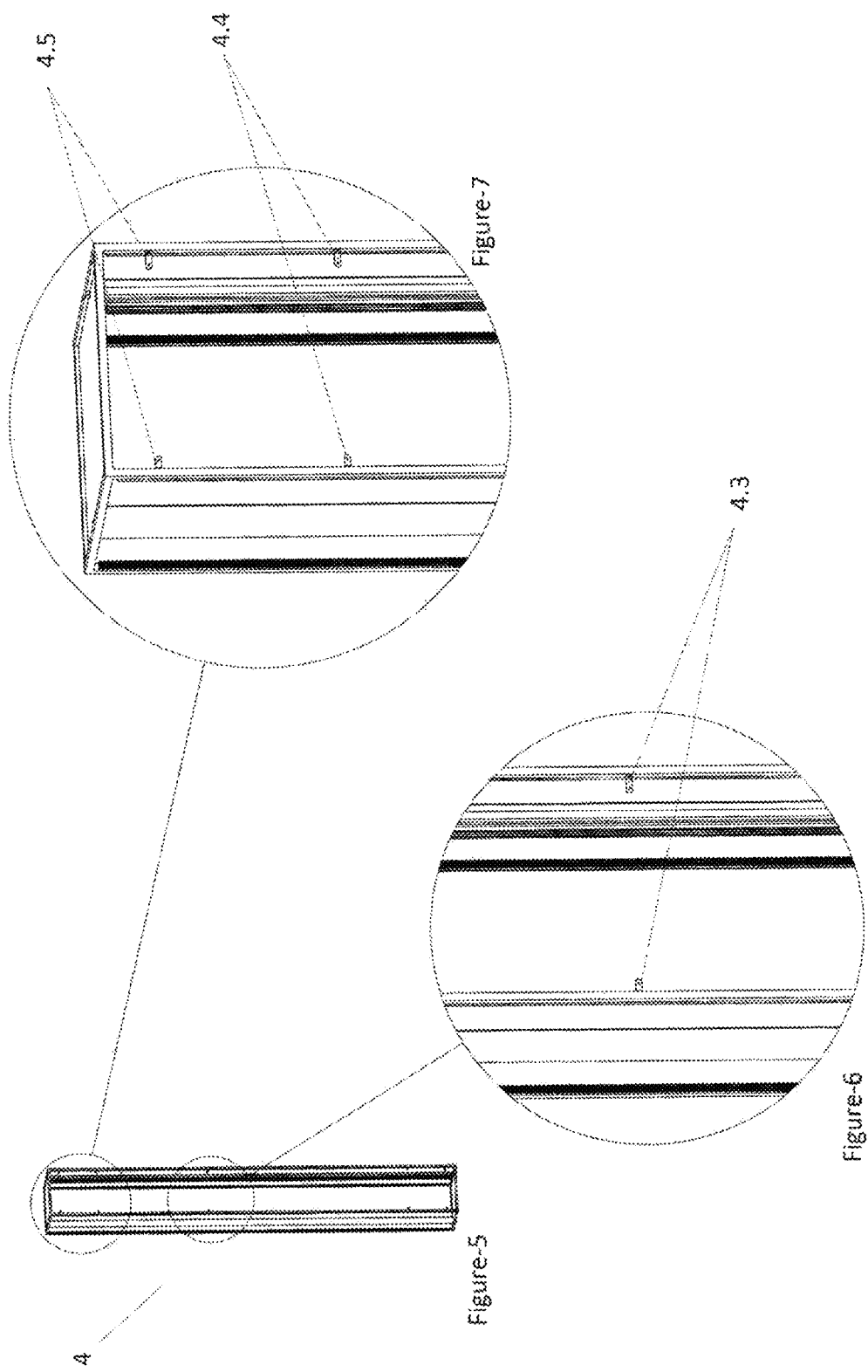

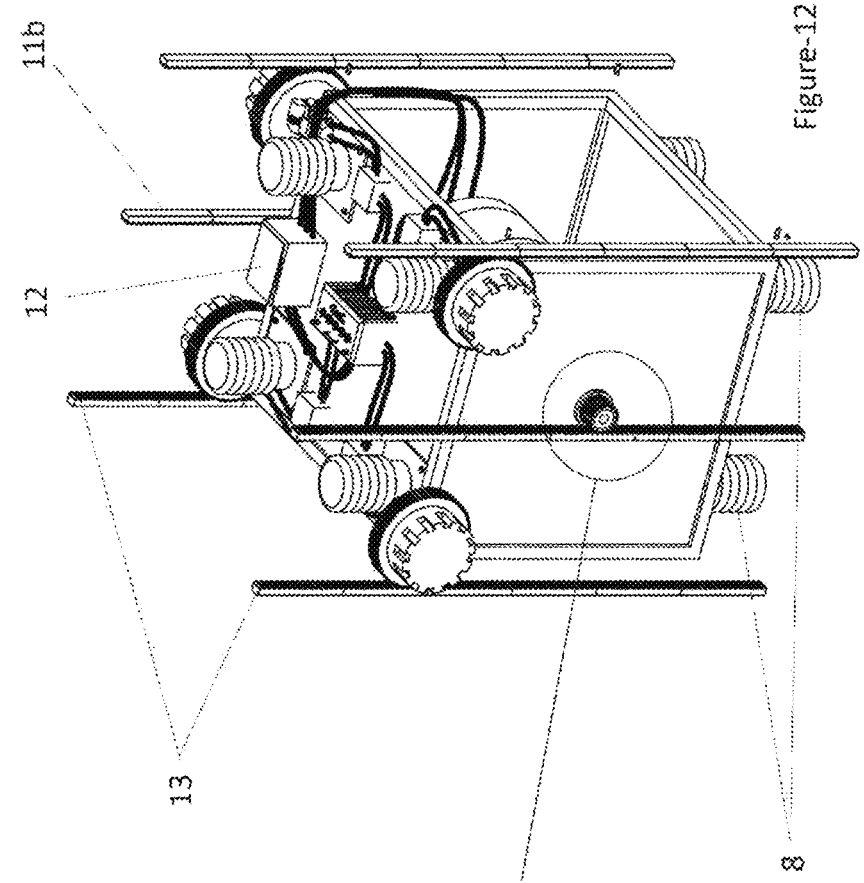
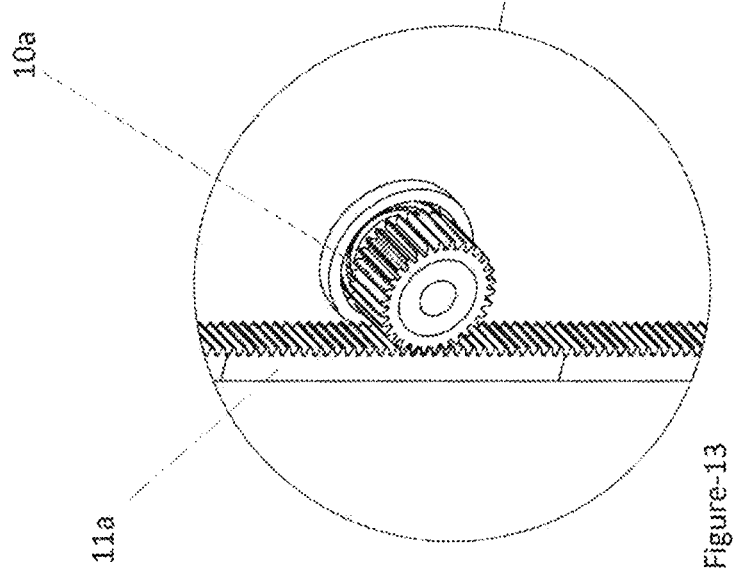
Figure-12
Figure-13

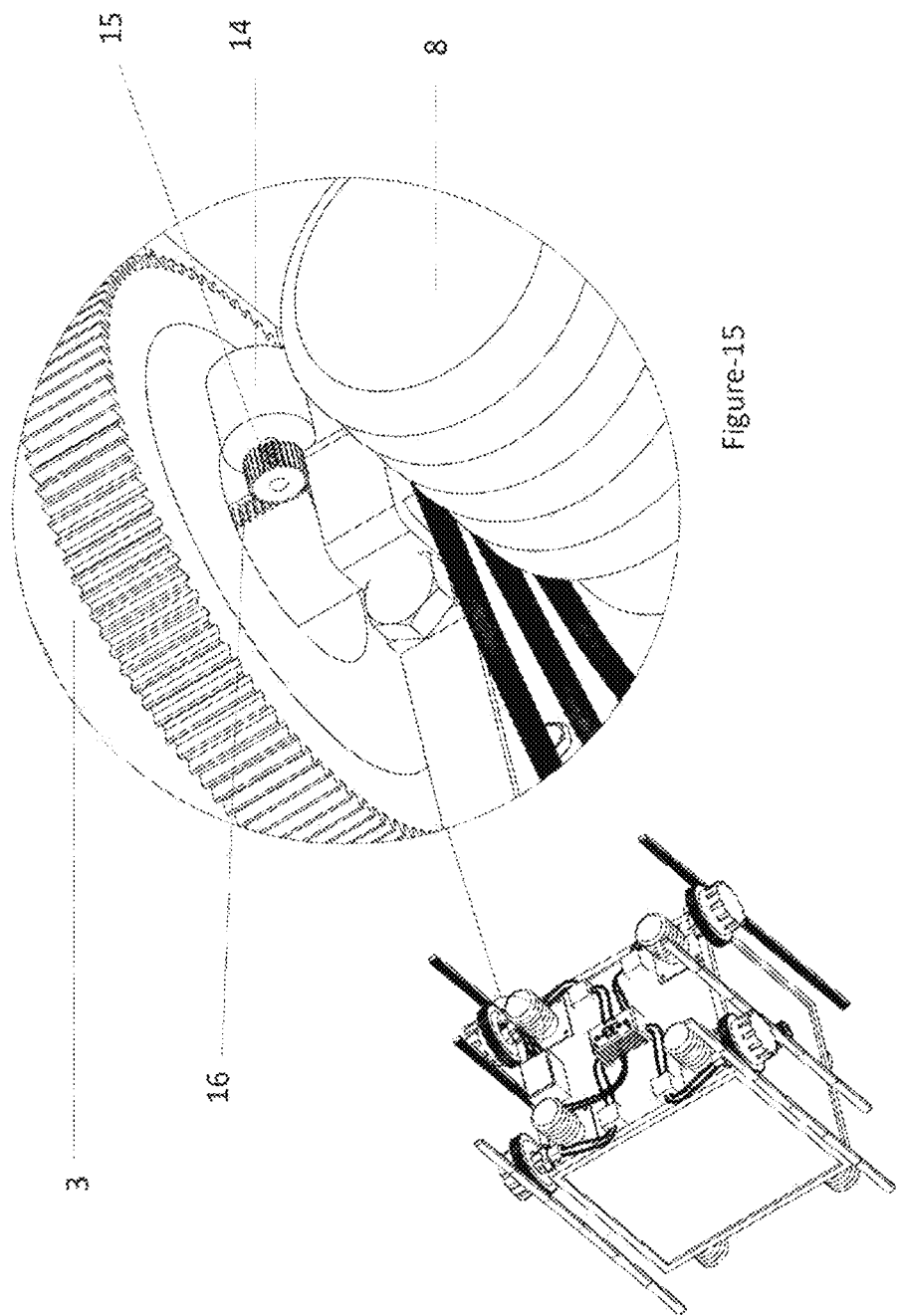

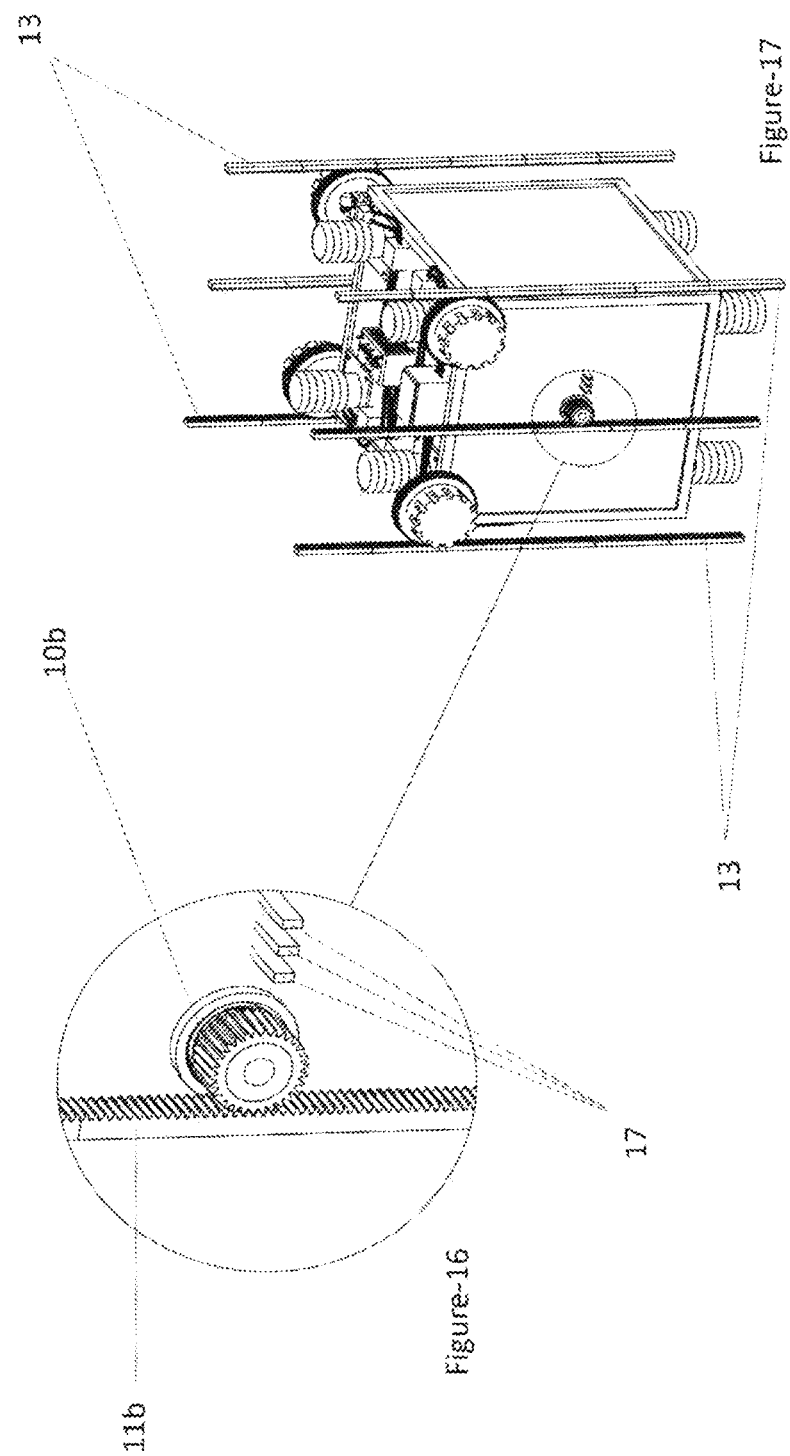

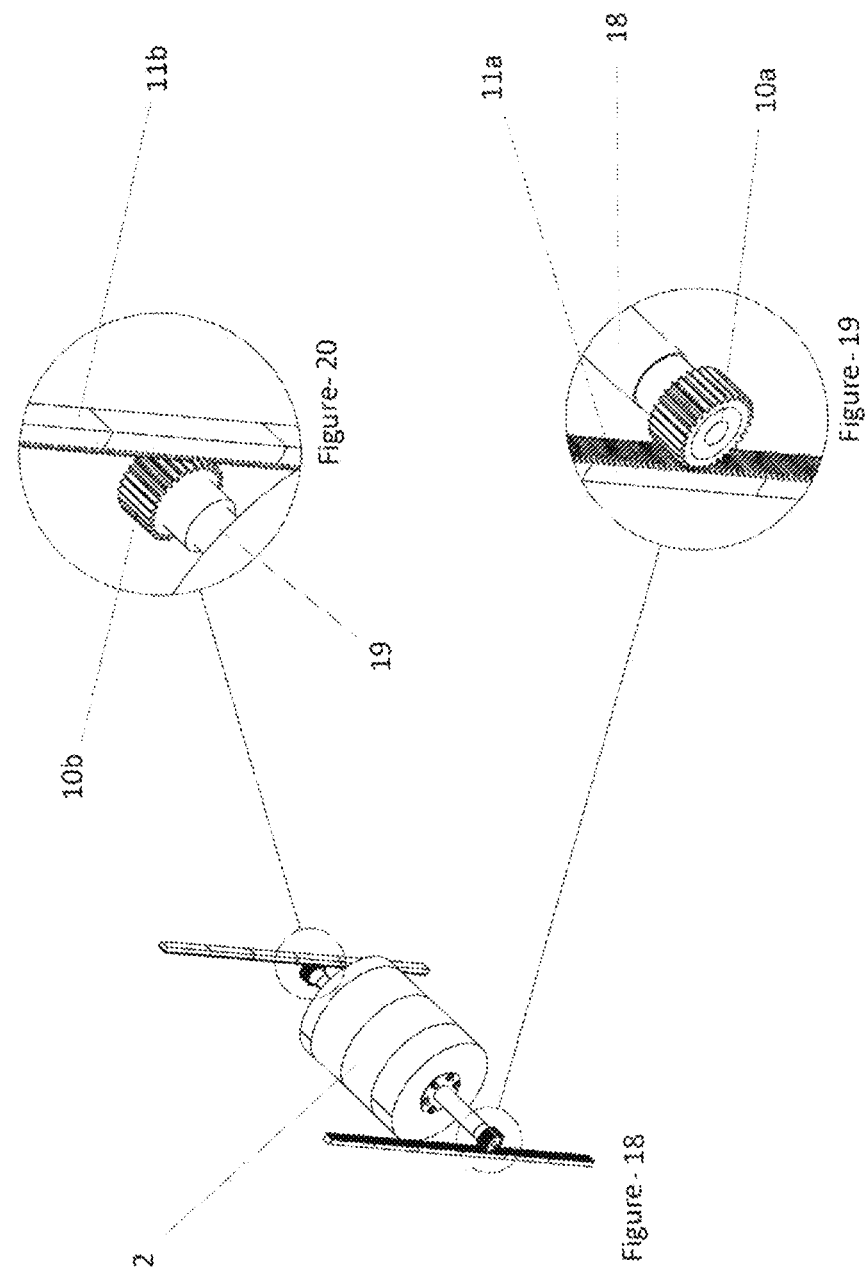

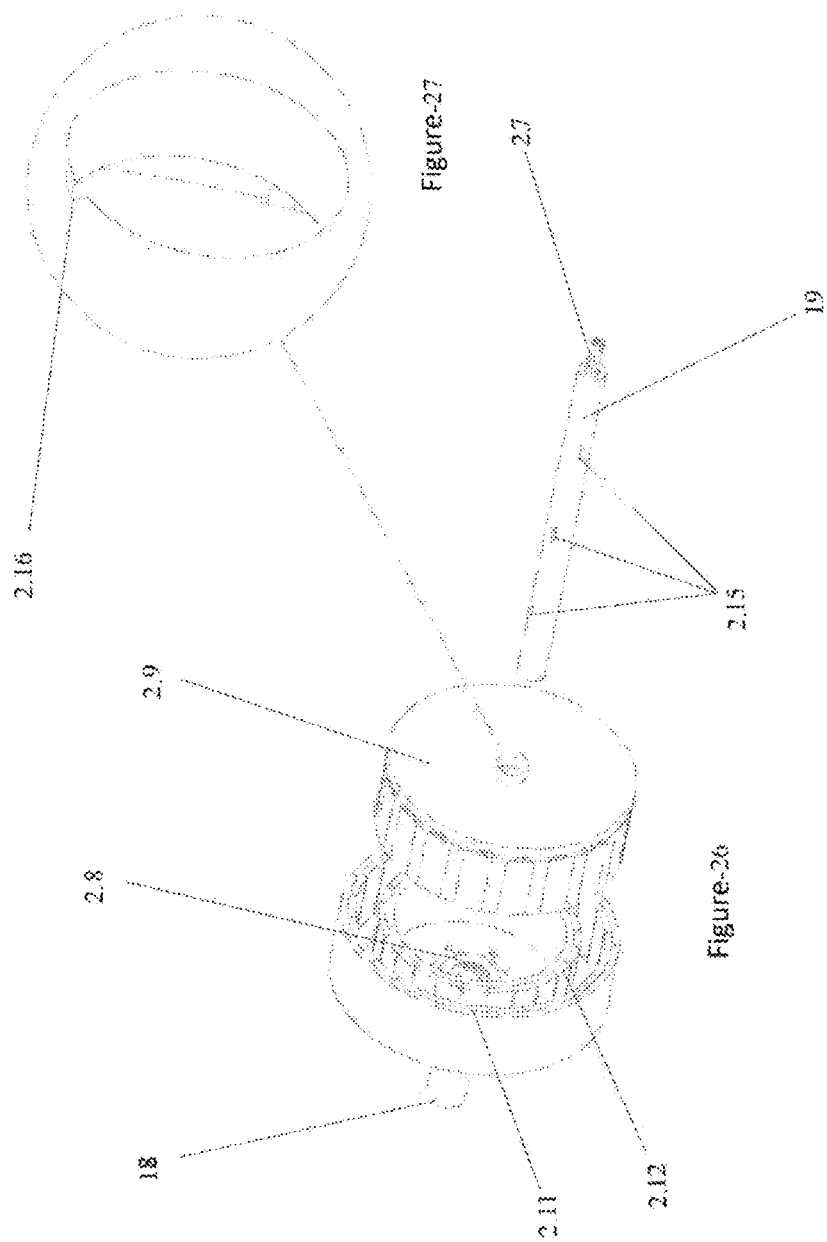

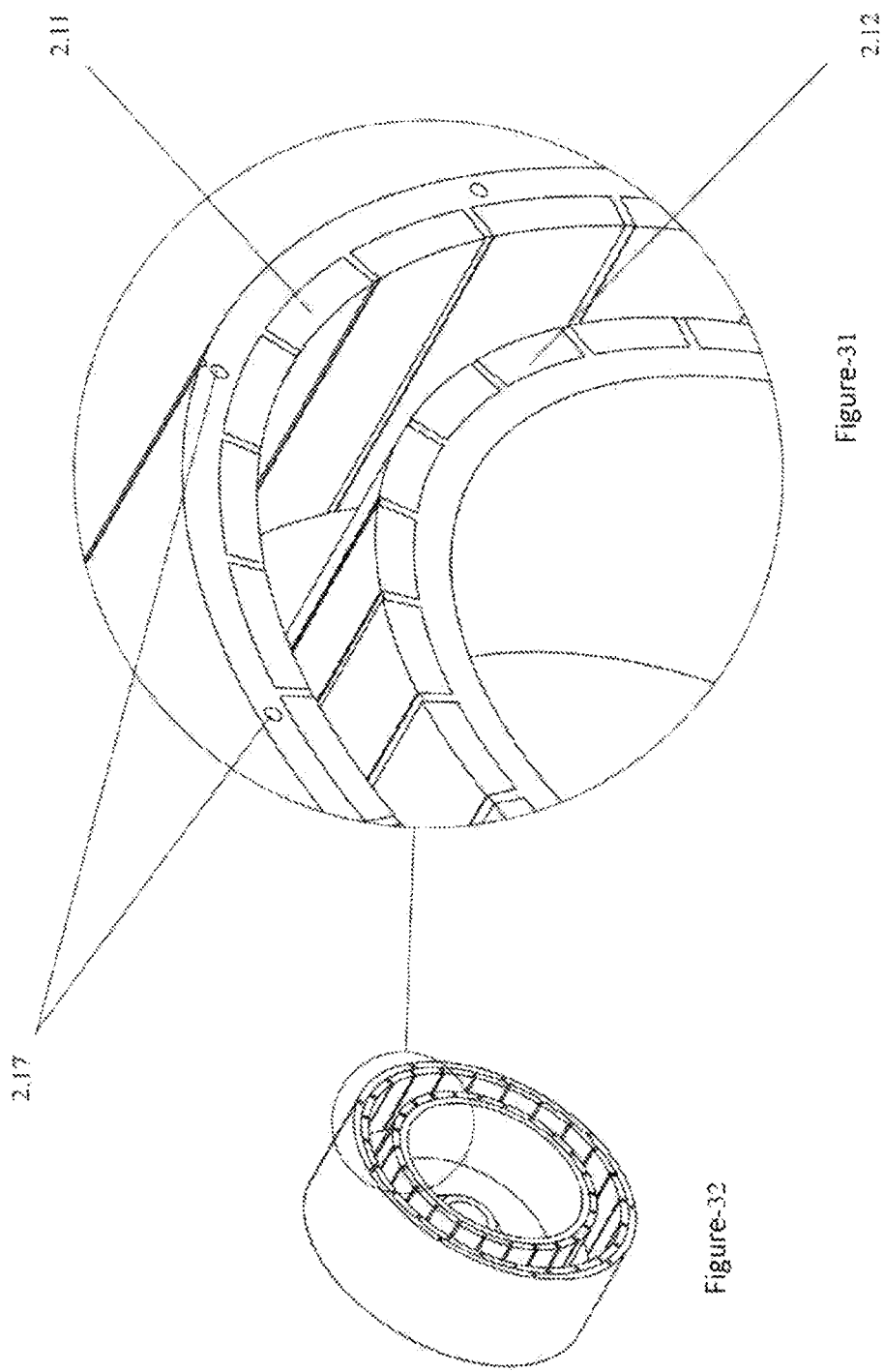

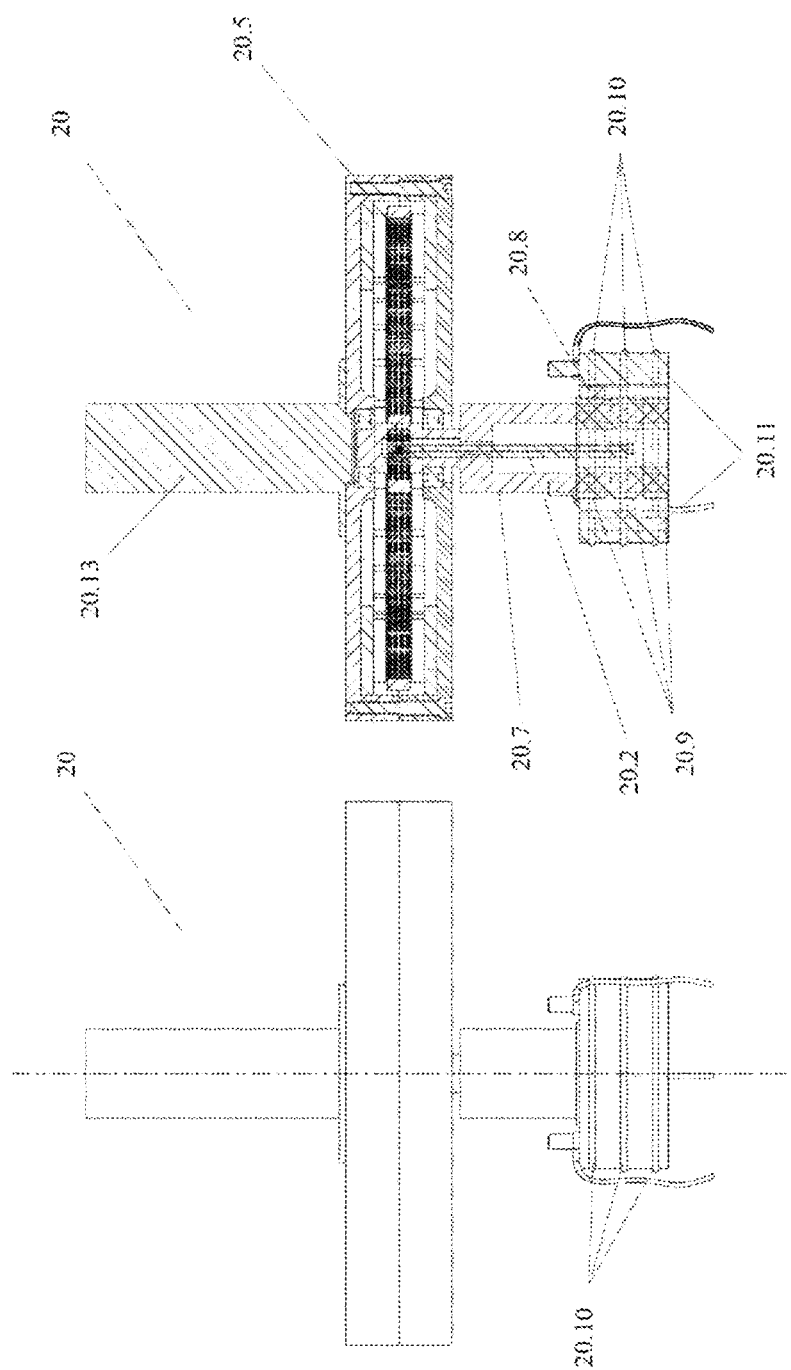

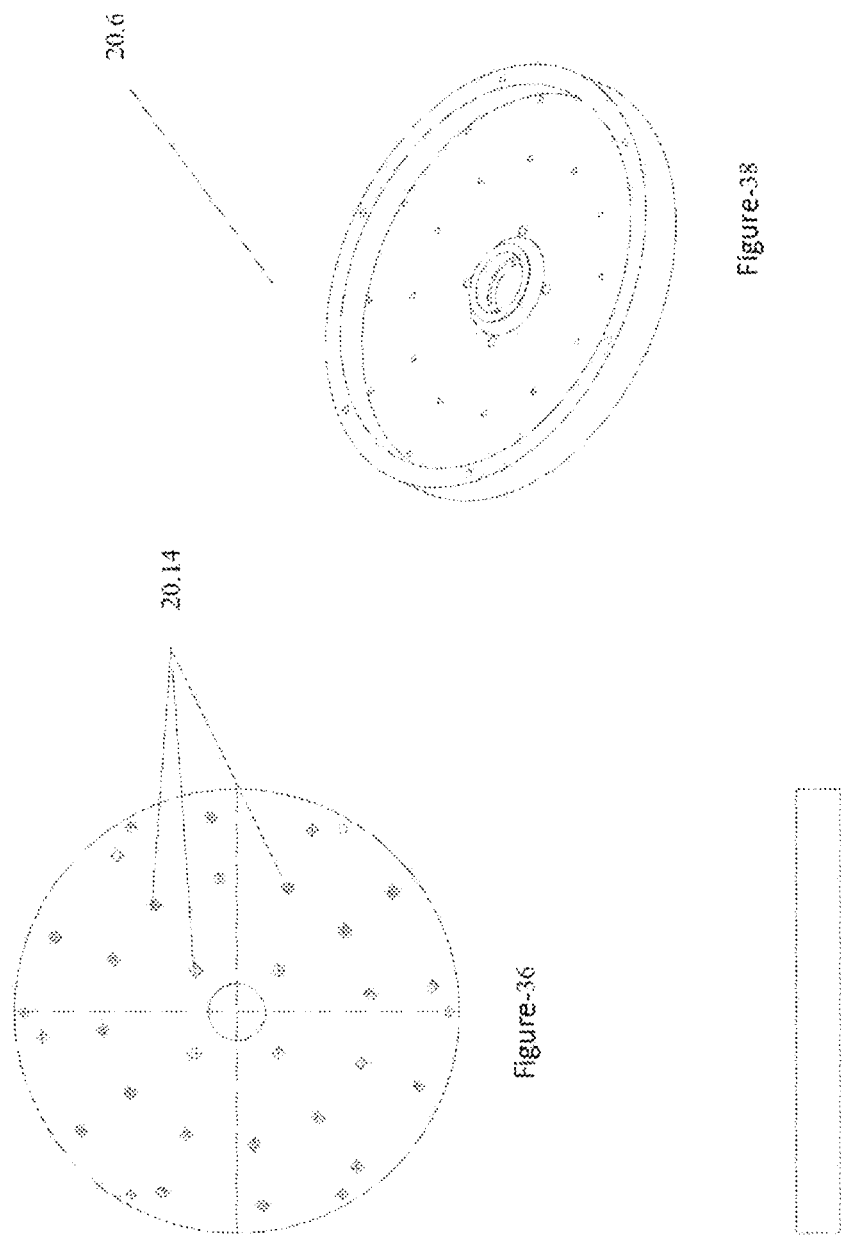

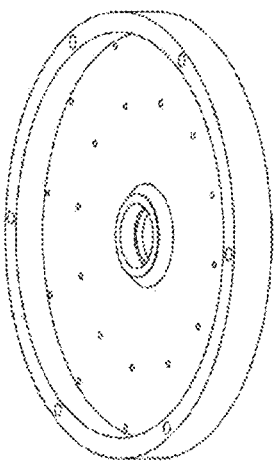
Figure-41
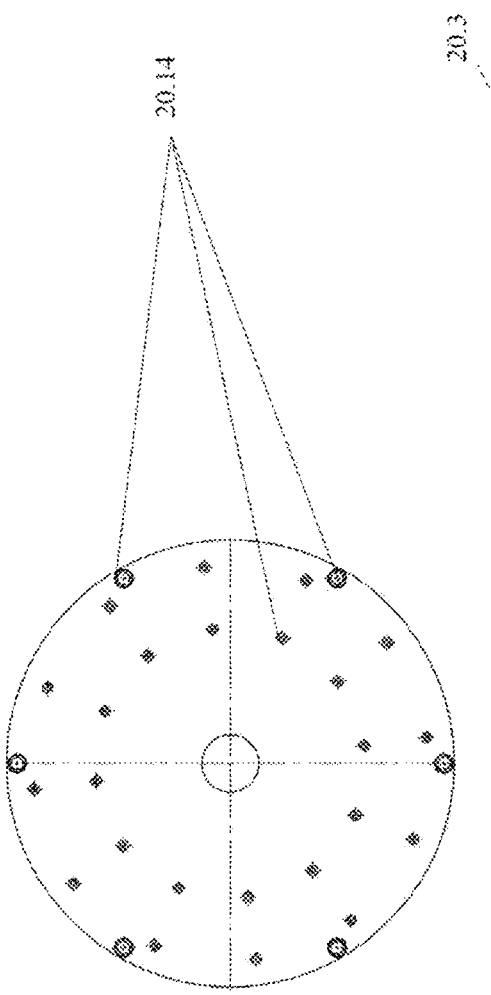
Figure-40
Figure-39

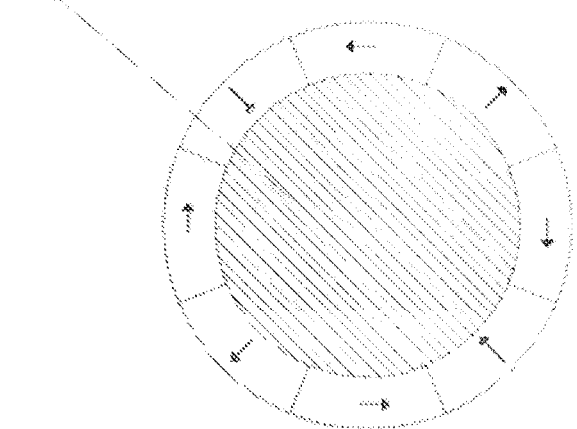
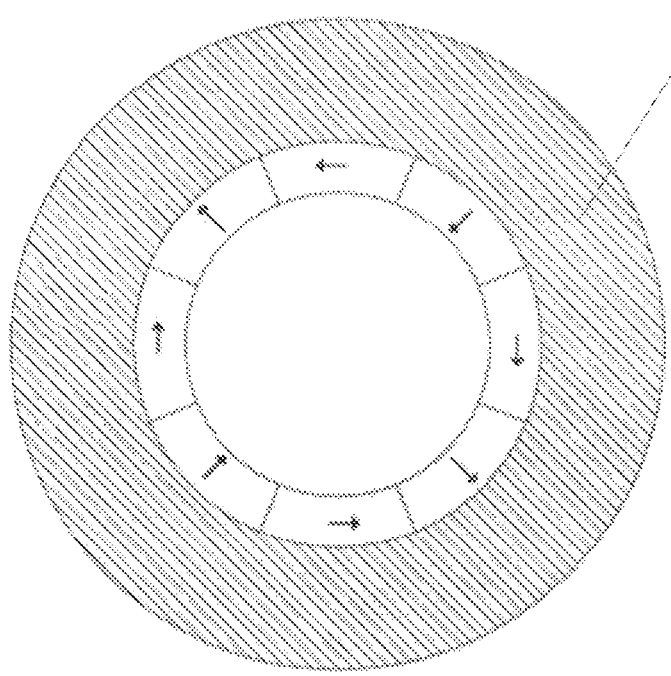

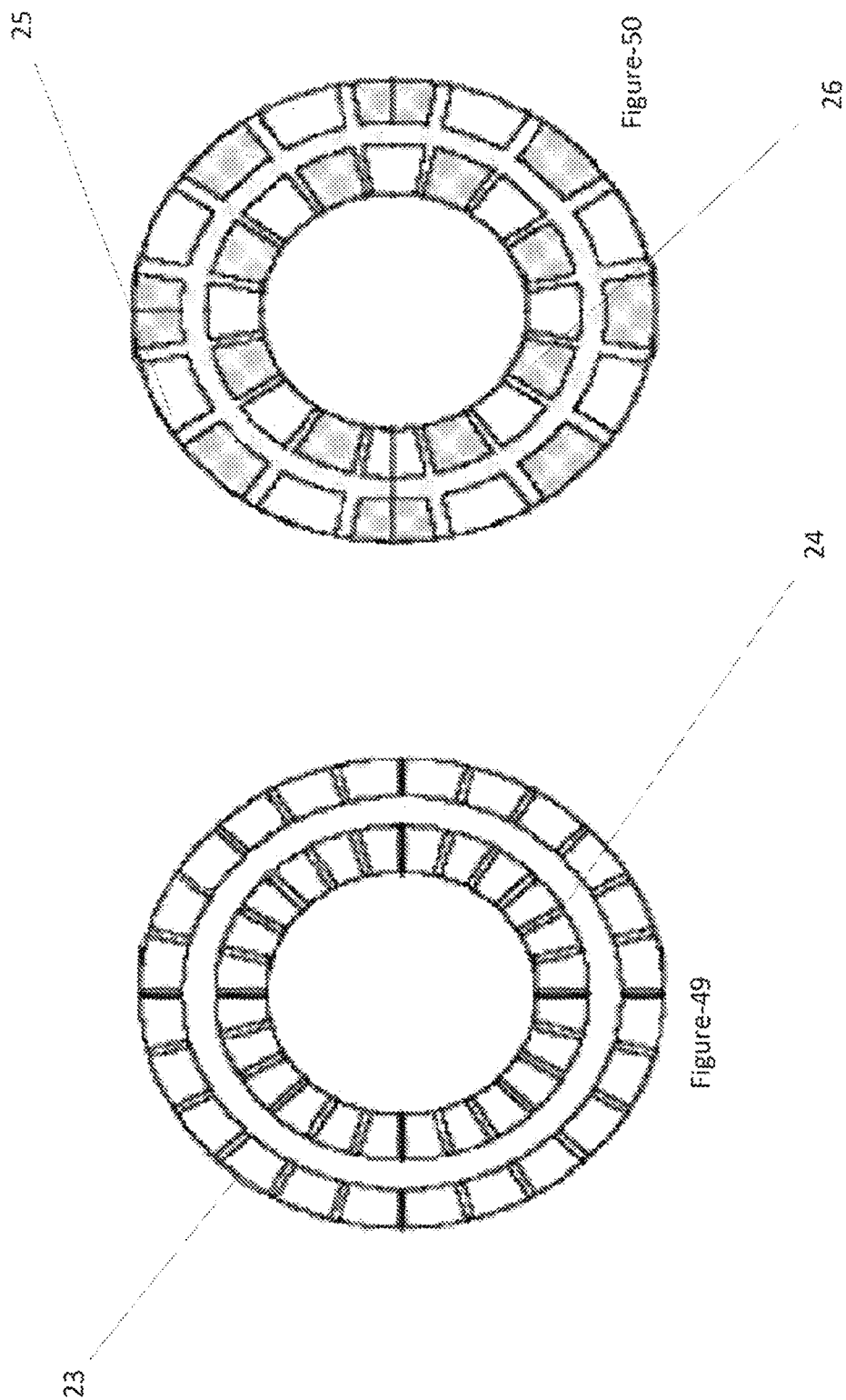

ELECTRICITY GENERATING SYSTEM WITH GRAVITY FORCE

Cross references

This application is a national stage application under 37 C.F.R 371 of International application number PCT/TR2019/051272 filed on Dec. 31, 2019.

TECHNICAL FIELD OF THE INVENTION

The present invention relates to a power plant having a generator that comprises stator and rotor rotating in opposite direction to one another and a novel method for generating electricity by means of said power plant.

PRIOR ART

Energy sources fall into two categories as renewable and non-renewable energy sources based on their formation. Non-renewable energy means exhaustible energy in brief. Non-renewable energy sources such as petroleum and natural gas are considered non-renewable as their renewal takes long periods of time. In other words, obtaining energy sources of this type requires using consumable fuels. When aforementioned consumable fuels burn, they release wastes and gasses that are hazardous to nature. Renewable energy, on the other hand, is the name given to energy sources that are obtainable from resources found in nature and replenished and provided by nature in perpetuity. Renewable energy sources are either less hazardous or non-hazardous in comparison to fossil fuels and non-renewable energy sources. These are also called inexhaustible energy resources.

In the state of the art, substantial part of energy is generated by using non-renewable energy sources, i.e. by consuming fossil fuels and radioactive elements. Each power plant individually pollutes the environment. That being said, in renewable energy sources costs are substantially high and yield is quite low. Furthermore, installation and maintenance activities incur high costs.

Gravity is the gravitational force that is applied by the Earth to objects located thereon. Gravitational force is the force that occurs due to mass of matters. In matters exposed to aforementioned gravitational force an accelerated motion occurs toward one another. Gravitational force increases as the mass gets greater. The magnitude of the gravitational force applied by the Earth to any object located thereon is called weight. Weight is indicated with "g". While the outermost shell of the Earth is rotating in one direction, the portion called mantle which is composed of various molten metal alloys, rotates in the opposite direction. Therefore, the Earth is a giant electric generator and gravitational force is created due to aforementioned rotation in opposite directions.

In the state of the art, Chinese patent document numbered CN103353087A discloses a gravity light. Said invention comprises of four parts, namely a rotation device, a generator, a control circuit and an LED light. The input of the rotation device is connected with the input of the generator, and the output of the generator, input of the control circuit and the output of the control circuit is connected with the LED light. During the operation of the gravity light, the gravity light is firstly hung to a high position, and subsequently a heavy matter is put on the rotation device of the gravity light in order to enable the gravity light to fall down naturally. Subsequently, the potential energy of the heavy matter is converted into the kinetic energy. Kinetic energy drives the generator, thereby generating electric energy. A heavy matter is put on aforementioned system. Potential energy is converted into kinetic energy as this heavy matter falls down to the ground level with the effect of gravity, and subsequently kinetic energy is converted to electrical energy by means of the generator. The system disclosed in the aforementioned patent document may be used for lighting operations of small scale. When said heavy matter reaches to the ground level, it needs to be lifted up by means of applying an external force. However, continuous power generation is not possible in aforementioned system. Disclosed system may be used for small scale lighting operations in places where electricity is not available. Moreover, the generator mentioned in said patent document is a conventional generator which rotates only the rotor. Said patent document does not disclose a generator having a stator and a rotor rotating in opposite directions to one another. Said invention comprises a gearbox having a plurality of gears in order to ensure that the heavy matter descends downwardly at a slow pace. Therefore, it possesses high malfunction risk. It may be used in cases where energy consumption levels are low.

OBJECTS OF THE INVENTION

The object of the present invention is to ensure that an integrated power plant that is capable of providing an alternative to both renewable and non-renewable energy sources is obtained by utilizing the gravitational force.

Another object of the present invention is to provide a sustainable electricity generation system that does not operate on fossil fuels and is less hazardous to environment and has less effects thereon when compared to conventional energy sources.

Yet another object of the present invention is to provide an electricity generation system that is both economical and long-lasting and requires less maintenance.

Yet another object of the present invention is to provide an electricity generation system in which transmission losses, malfunctions and illegal uses may be prevented in an effective manner.

Yet another object of the present invention is to make contributions to national economy by increasing domestic energy generation.

Yet another object of the present invention is to ensure that electricity generation systems which do not affect daily life negatively and do not bring harm to animals and to nature, may be installed next to buildings as an alternative to power plants generating energy outside residential areas.

The power plant developed in order to achieve aforementioned objects comprises;
- rotor generator linear gear (11*a*) and stator generator linear gear (11*b*) positioned in opposite directions to one another relatively to the generator axis consisting of rotor shaft (18) and stator shaft (19),
- rotor generator impeller (10*a*) and stator generator impeller (10*b*) that come into contact with said rotor generator linear gear (11) and with said stator generator linear gear (11*b*), and have rotational motion in opposite directions to one another,
- at least one carrying motor (3) that allows for lifting the mechanism (6) up by means of the motor linear gear (13),
- sensor groups (4.1, 4.2, 4.3, 4.4, 4.5) that detect the position of the mechanism (6), a battery (7) and/or power supply and/or electricity grid that provides the electrical energy needed by the system, a charge control circuit included in the control unit for the purpose of charging when said battery (7) and/or power supply runs out of charge, brush-slip ring (21) system and mechanism phase output (17) for drawing out the electricity generated in said generator, a control unit (12) that controls acceleration, deceleration and stopping actions of the mechanism (6) of which position is detected by means of the sensor groups (4.1, 4.2, 4.3, 4.4, 4.5), and motor drive circuit (9) that performs said actions.

DESCRIPTION OF THE FIGURES

FIG. 1 provided in the annex, illustrates the perspective view of the inventive power plant (1).

FIG. 2 illustrates the detailed perspective view of the inventive power plant (1).

FIG. 3 illustrates the perspective view of the outer cage (4) used in the inventive power plant (1).

FIG. 4 illustrates the detailed view of the outer cage (4) used in the inventive power plant (1).

FIG. 5 illustrates the perspective view of the outer cage (4) used in the inventive power plant (1).

FIG. 6 illustrates the detailed view of the outer cage (4) used in the inventive power plant (1).

FIG. 7 illustrates the detailed view of the outer cage (4) used in the inventive power plant (1).

FIG. 12 illustrates the perspective view of the mechanism (6) and bars used in the inventive power plant (1).

FIG. 13 illustrates the detailed view of generator impellers (10a, 10b) and generator linear gears (11a, 11b) included in the inventive power plant (1).

FIG. 14 illustrates the isometric view of the mechanism (6) and bars included in the inventive power plant (1).

FIG. 15 illustrates the detailed view of the carrying motor (3) and servo/linear motor (14) included in the inventive power plant (1).

FIG. 16 illustrates the detailed view of generator impellers (10a, 10b) and generator linear gears (11a, 11b) included in the inventive power plant (1).

FIG. 17 illustrates the general perspective view from the right of the mechanism (6) and bars included in the inventive power plant (1).

FIG. 18 illustrates the isometric view of the multistage generator (2) and generator linear gears (11a, 11b).

FIG. 19 illustrates the detailed view of the multistage generator (2) and generator linear gears (11a, 11b).

FIG. 20 illustrates the detailed view of the multistage generator (2) and generator linear gears (11a, 11b).

FIG. 26 illustrates the perspective view of the multistage generator stator (2.9) and the nested rotor group which consists of inner rotor (2.12) and outer rotor (2.11) and is used in the multistage generator (2).

FIG. 27 illustrates the detailed view of the keyway (2.16) used in the multistage generator (2).

FIG. 31 illustrates the detailed perspective view of the nested rotor group consisting of inner rotor (2.12) and outer rotor (2.11) used in the multistage generator (2).

FIG. 32 illustrates the perspective view of the nested rotor group consisting of inner rotor (2.12) and outer rotor (2.11) used in the multistage generator (2).

FIG. 34 illustrates the front view of the twin-rotor (20.4) single generator (20) together with the brush (20.8) and slip ring (20.9).

FIG. 35 illustrates the sectional view of the twin-rotor (20.4) single generator (20) together with the brush (20.8) and slip ring (20.9).

FIG. 36 illustrates the top view of the lower cover (20.6) used in the single generator (20).

FIG. 37 illustrates the side view of the lower cover (20.6) used in the single generator (20).

FIG. 38 illustrates the perspective view of the lower cover (20.6) used in the single generator (20).

FIG. 39 illustrates the top view of the upper cover (20.3) used in the single generator (20).

FIG. 40 illustrates the perspective view of the upper cover (20.3) used in the single generator (20).

FIG. 41 illustrates the side view of the upper cover (20.3) used in the single generator (20).

FIG. 47 illustrates the top view of the Halbach rotor structure for generators with inner rotors for an alternative embodiment of the present invention.

FIG. 48 illustrates the top view of the Halbach rotor structure for generators with outer rotors for an alternative embodiment of the present invention.

FIG. 49 illustrates the top view of the stator shape of a field-controlled axial flux surface-magnetic generator for an alternative embodiment of the present invention.

FIG. 50 illustrates the top view of the rotor shape of a field-controlled axial flux surface-magnetic generator for an alternative embodiment of the present invention.

Figure 10:
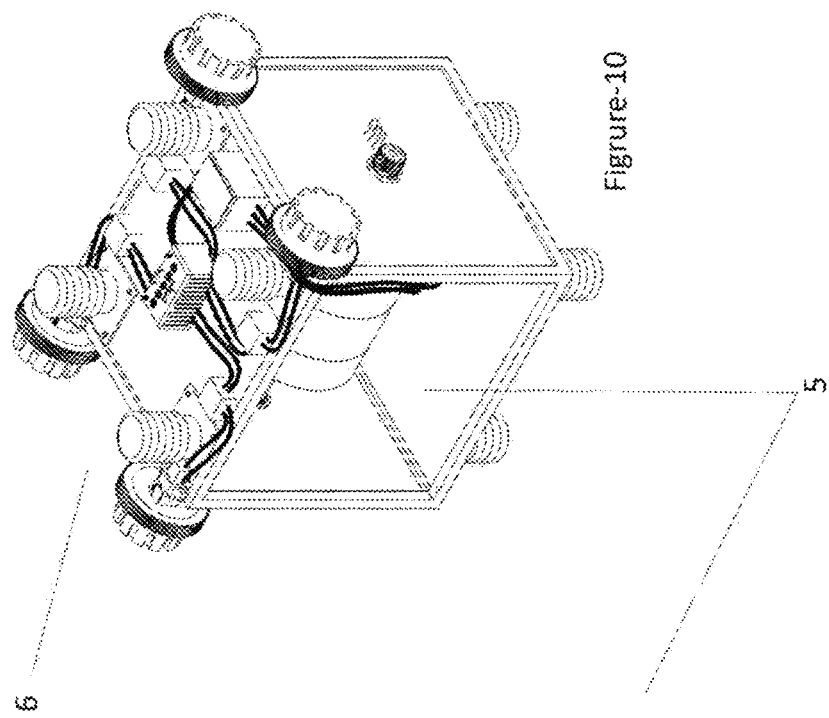
FIG. 10 illustrates the perspective view of the mechanism (6).
Figure 9:
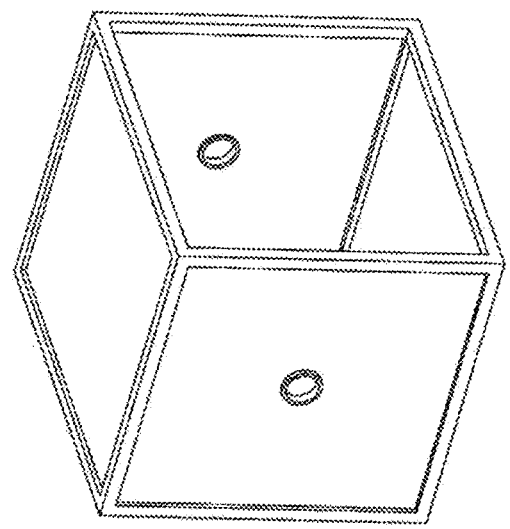
FIG. 9 illustrates the perspective view of the inner cage (5) on which the components composing the mechanism (6) are fixed.
Figure 8:
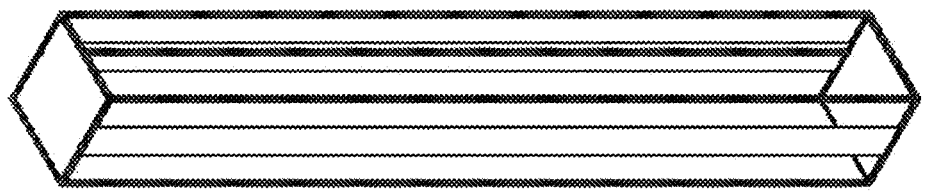
FIG. 8 illustrates the top perspective view of the outer cage (4) used in the inventive power plant (1).
Figure 11:
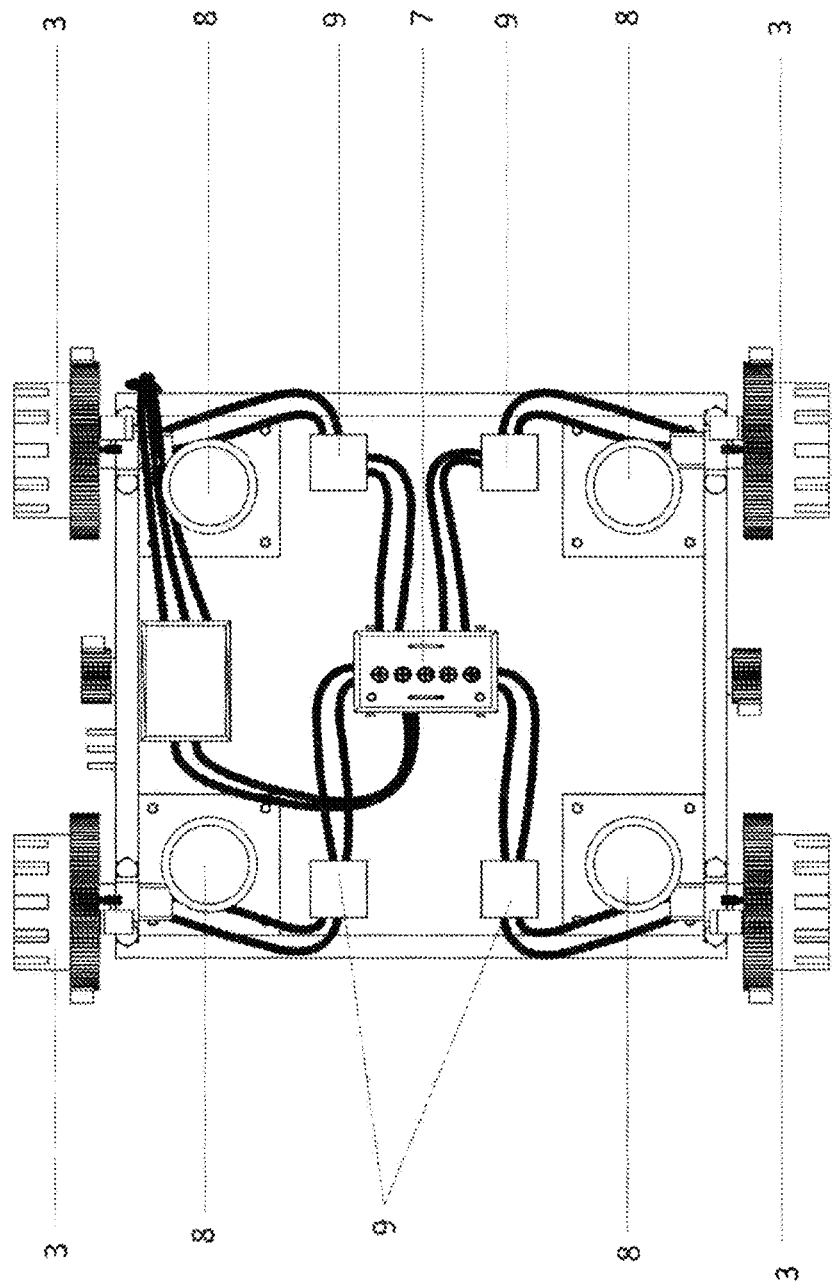
FIG. 11 illustrates the top view of the mechanism (6).
Figures 21, 22:
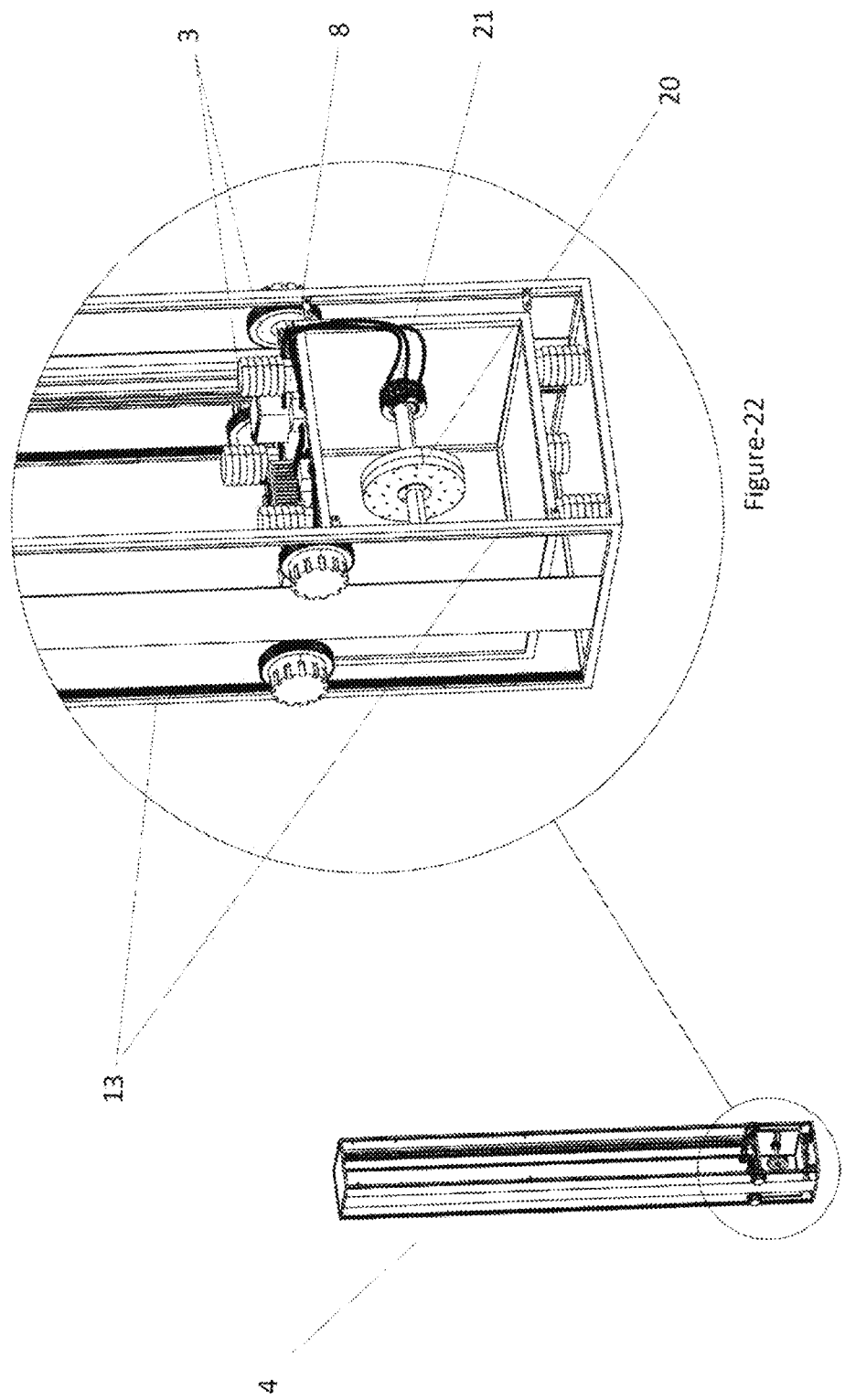
FIG. 21 illustrates the general view of the power plant (1) utilizing single generator (20).
FIG. 22 illustrates the detailed view of the power plant (1) utilizing single generator (20).
Figure 23:
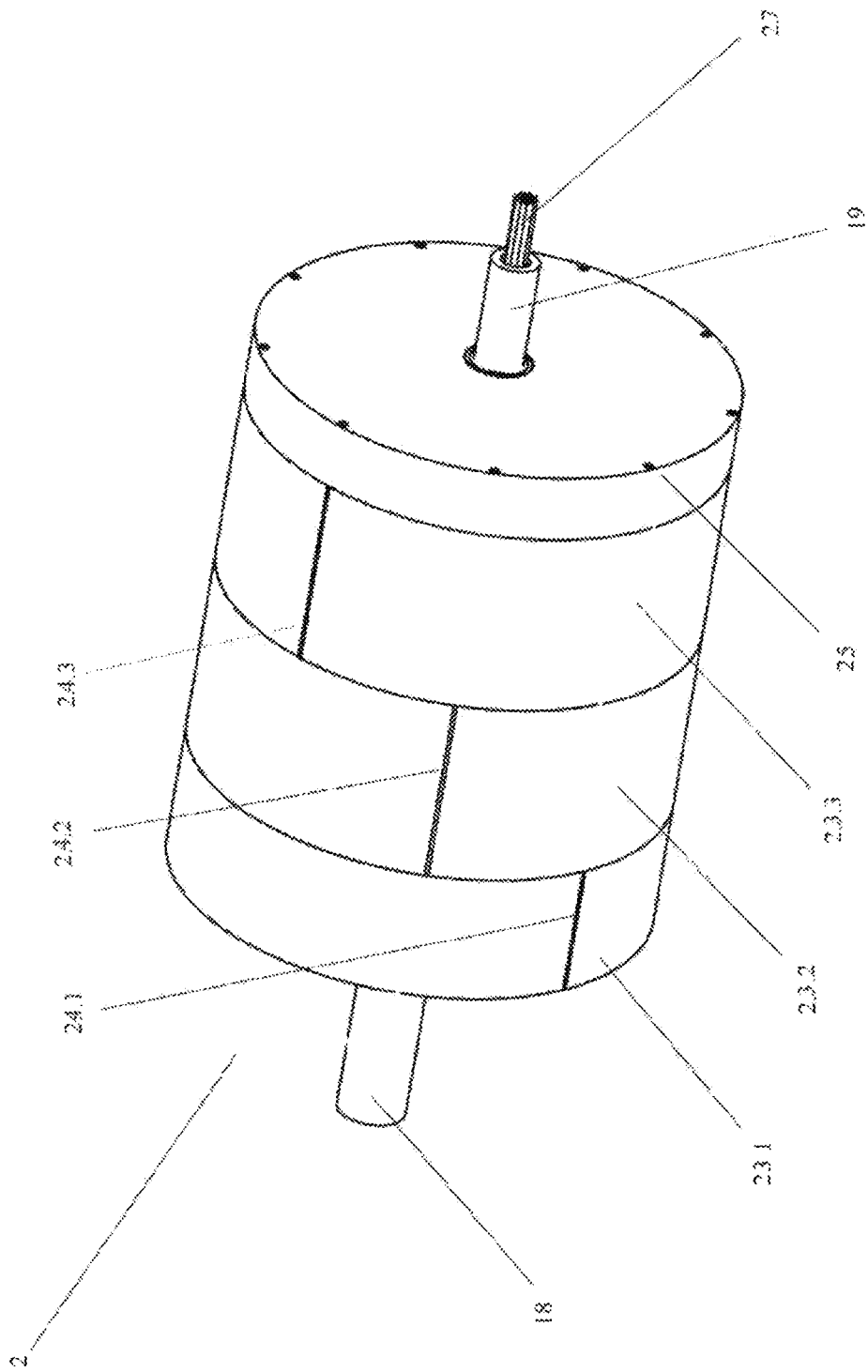
FIG. 23 illustrates the front perspective view of the multistage generator (2).
Figure 24:
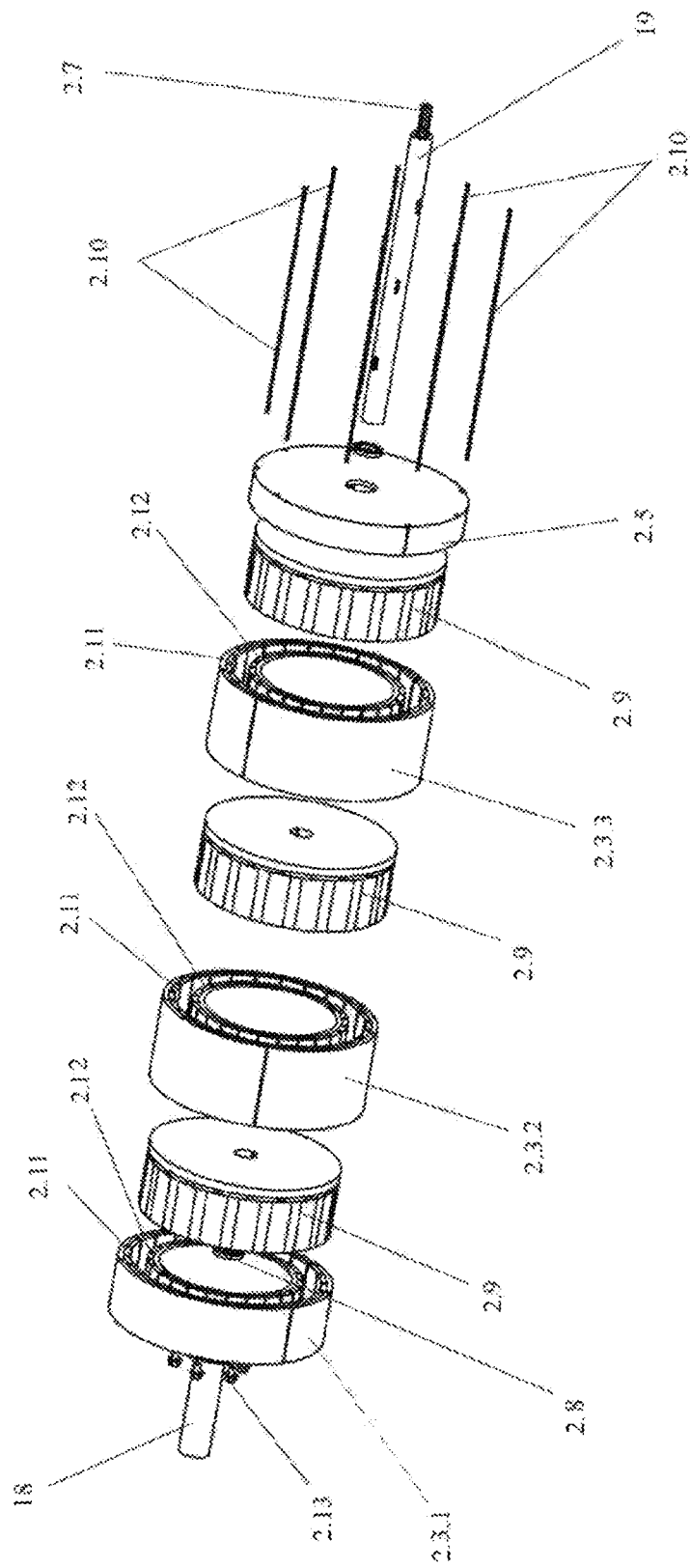
FIG. 24 illustrates the exploded side view of the multistage generator (2).
Figure 25:
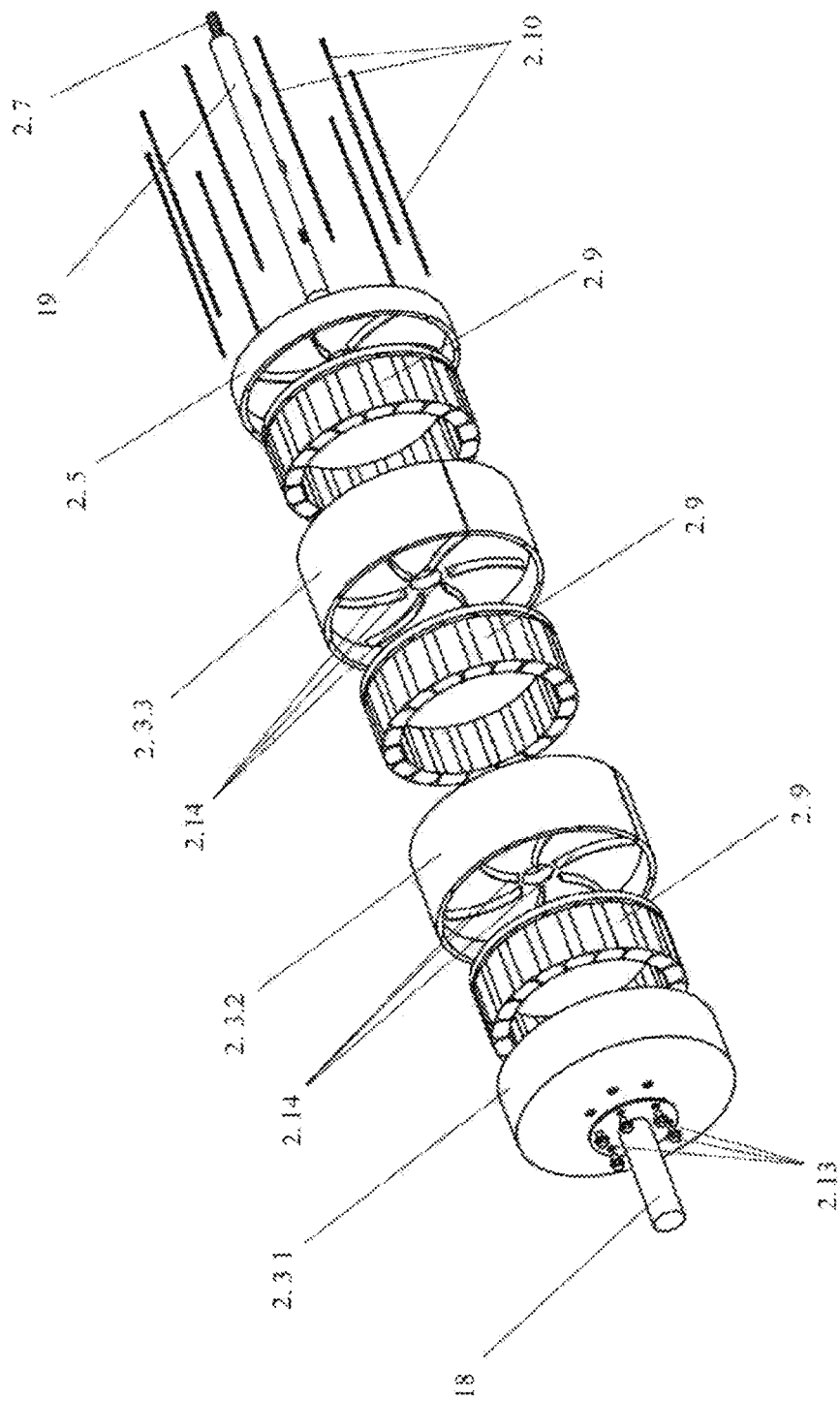
FIG. 25 illustrates the exploded front view of the multistage generator (2).
Figure 28:
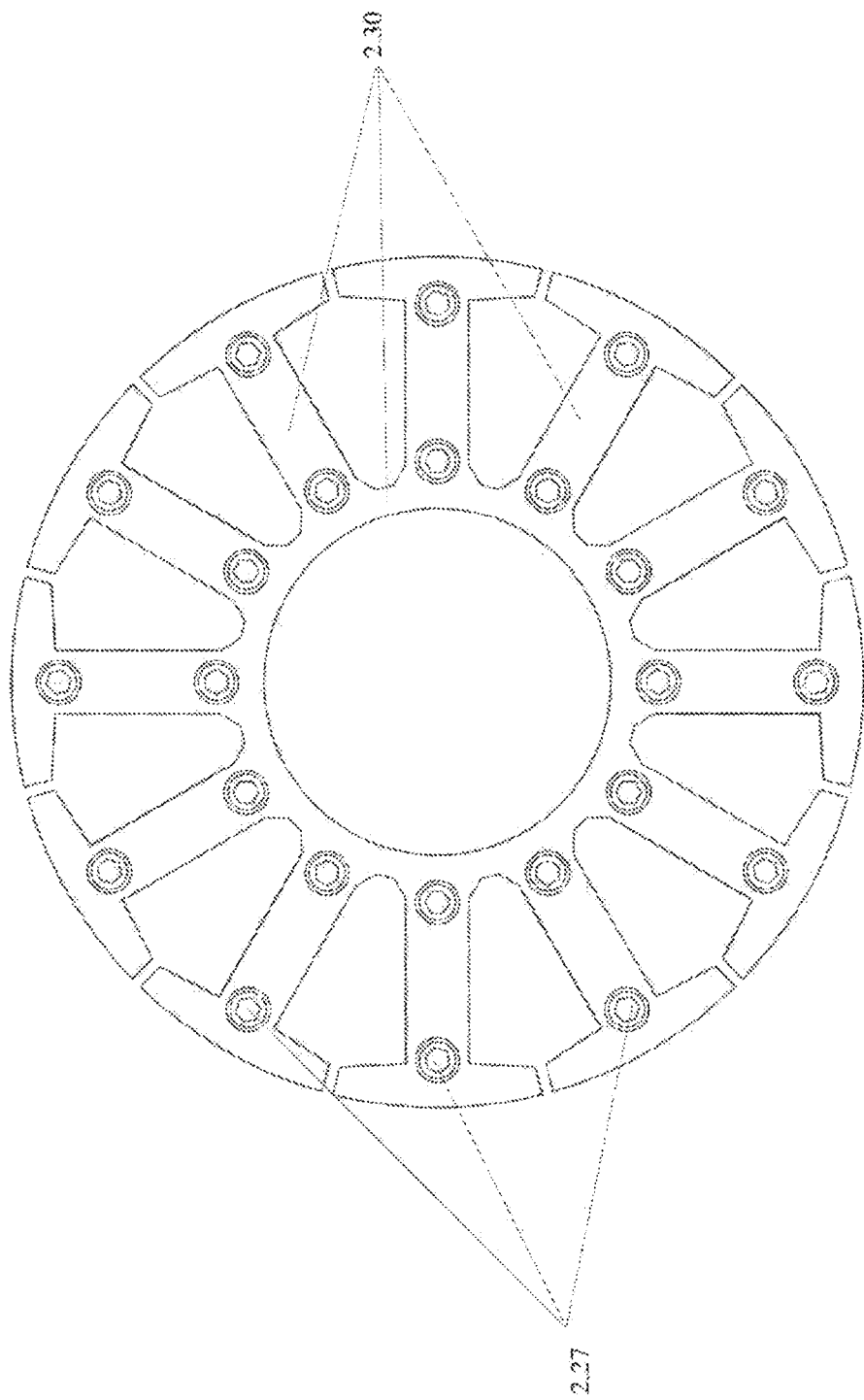
FIG. 28 illustrates the top view of the multistage generator stator (2.9).
Figure 29:
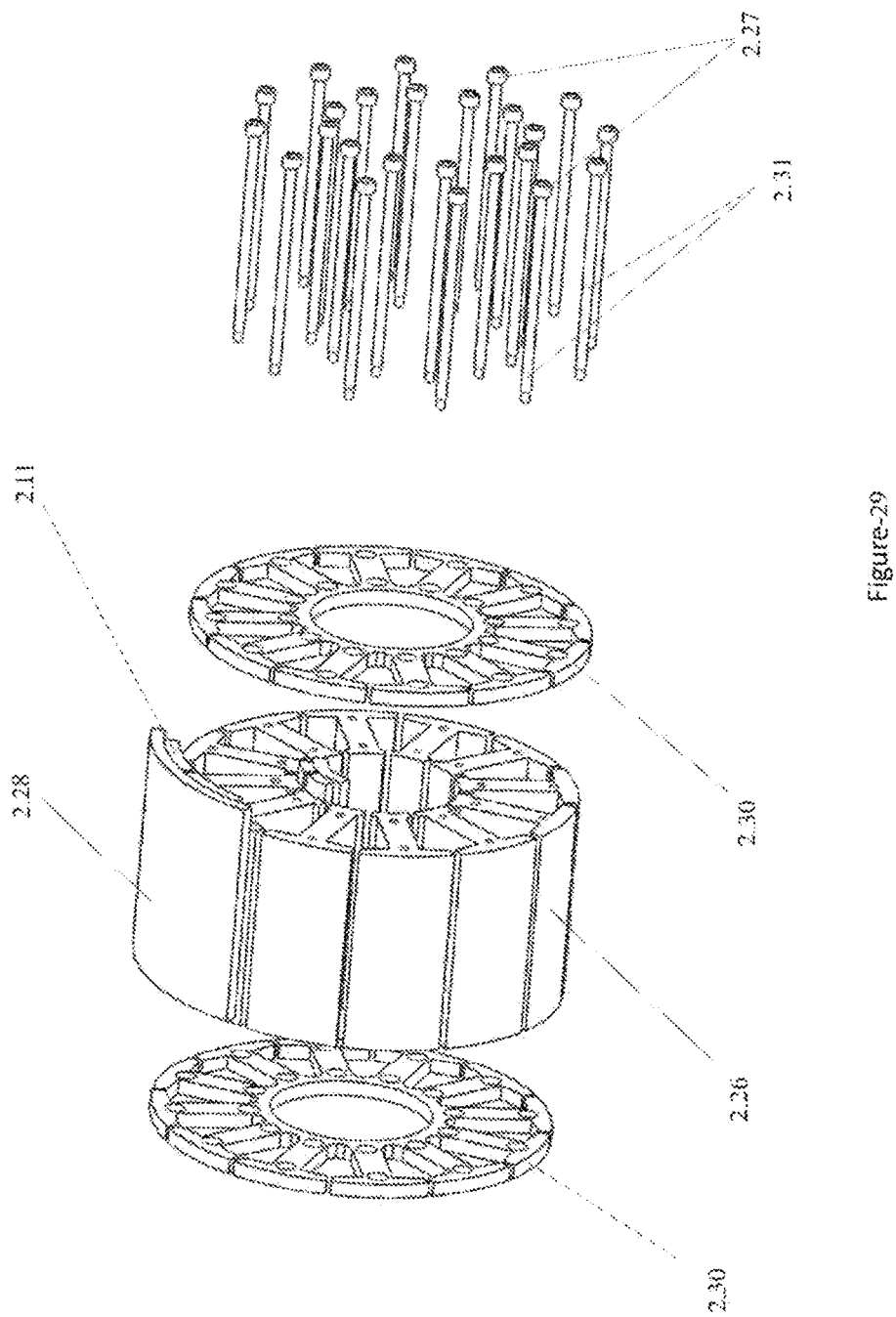
FIG. 29 illustrates the perspective view of the multistage generator stator (2.9).

Main components disclosed in the figures are enumerated and provided with names thereof down below.

(1) Power Plant
(2) Multistage Generator
   (2.3.1) Rotor $1^{st}$ Stage
   (2.3.2) Rotor $2^{nd}$ Stage
   (2.3.3) Rotor $3^{rd}$ Stage
   (2.4.1) $1^{st}$ Stage Position Line
   (2.4.2) $2^{nd}$ Stage Position Line
   (2.4.3) $3^{rd}$ Stage Position Line
   (2.5) Cover
   (2.7) Phase Output
   (2.8) Bearing
   (2.9) Multistage Generator Stator
   (2.10) Rotor Fixing Screw
   (2.11) Outer Rotor
   (2.12) Inner Rotor
   (2.13) Rotor Shaft Screw
   (2.14) Cooling Channels
   (2.15) Wedge
   (2.16) Keyway
   (2.17) Rotor Fixing Screw Socket
   (2.26) Siliceous Sheet Metal Plate
   (2.27) Countersunk Bolt
   (2.28) Outer Rotor Sheet Metal Plate
   (2.29) Inner Rotor Sheet Metal Plate
   (2.30) Flange Sheet Metal Plate
   (2.31) Stud Bolt
   (2.32) Stud Bolt Clearance
(3) Carrying Motor
(4) Outer Cage
   (4.1) First Sensor Group
   (4.2) Second Sensor Group
   (4.3) Third Sensor Group
   (4.4) Fourth Sensor Group
   (4.5) Fifth Sensor Group
(5) Inner Cage
(6) Mechanism
(7) Battery (Accumulator)
(8) Spring
(9) Motor Drive Circuit
(10a) Rotor Generator Impeller
(10b) Stator Generator Impeller
(11a) Rotor Generator Linear Gear
(11b) Stator Generator Linear Gear
(12) Control Unit
(13) Motor Linear Gear
(14) Servo/Linear Motor
(15) Servo/Linear Motor Impeller
(16) Servo/Linear Motor Gear Rack
(17) Mechanism Phase Output
(18) Rotor Shaft
(19) Stator Shaft
(20) Single Generator
   (20.2) Generator Phase Output
   (20.3) Upper Cover
   (20.4) Rotor
   (20.5) Stator
   (20.6) Lower Cover
   (20.7) Single Generator Stator Shaft
   (20.8) Brush
   (20.9) Slip Ring
   (20.10) Divider
   (20.11) Housing
   (20.12) Magnet Holding Plate
   (20.13) Single Generator Rotor Shaft
   (20.14) Screw Clearance
   (20.15) Magnet
   (20.16) Coil
   (20.17) Magnet Cavity
(21) Brush-Slip Ring
(22) Magnetic Field Area
(23) Generator Windings
(24) Motor Windings
(25) Generator Magnets
(26) Motor Magnets
(G1) High Torque
(G2) Carrying Motor First Upward Operating Area
(G3) Maximum Power
(G4) Carrying Motor Second Downward Operating Area

DETAILED DESCRIPTION OF THE INVENTION

The present invention relates to a power plant having a generator that comprises stator and rotor rotating in opposite direction to one another and a novel method for generating electricity by means of said power plant.

Power plant (1) comprises outer cage (4) and mechanism (6). The outer cage (4) contains; generator linear gears (11a, 11b), motor linear gear (13), first sensor group (4.1), second sensor group (4.2), third sensor group (4.3), fourth sensor group (4.4) and fifth sensor group (4.5). Battery (7), spring (8), motor drive circuit (9), generator impellers (10a, 10b), generator linear gears (11a, 11b), control unit (12), motor linear gear (13), servo/linear motor (14), servo/linear motor impeller (15), servo/linear motor gear rack (16), mechanism phase output (17), rotor shaft (18) and stator shaft (19) are positioned inside the inner cage within the mechanism (6).

Sensor groups (4.1, 4.2, 4.3, 4.4, 4.5) are positioned on the outer cage (4) of the inventive system that generates electricity through gravitational force in order to determine distances. Said sensor groups (4.1, 4.2, 4.3, 4.4, 4.5) assume the function of decelerating and stopping the moving mechanism (9) by determining the position thereof by means of the control unit (12) and motor drive circuit (9). When the mechanism (6) reaches to the upper area of the outer cage (4), said mechanism (6) is initially decelerated by means of the fourth sensor group (4.4) and subsequently stopped by means of the fifth sensor group (4.5). Analogously, when the mechanism (6) reaches to the lower area of the outer cage (4), said mechanism (6) is decelerated first by means of the second sensor group (4.2) and subsequently is brought to a halt by means of the first sensor group (4.1).

Control units (12) are semi-intelligent, programmed systems capable of processing data received from different sensors connected to the system by means of installing software and uploading algorithms from PLCs and electronic circuit boards to different processors such as PIC, Arduino located on these circuit boards, and accordingly of controlling parameters such as speed, revs, direction of revs, activation and deactivation times of motors based on said data. Said control units are also capable of controlling transitions of air, water, gas, oil or other fluid systems. They are utilized in every field of industry.

Motor drive circuit (9) is a term that is in the general sense thereof as the equipment-device which controls any load in the automation industry. For instance, AC driver or inverter terms are used for devices that control AC (alternative current) motors; DC driver term is used for devices that control DC (direct current) motors; and servo driver terms is used for servo motors. AC power input is rectified by means of the rectifying unit in the driver. Busbar gained from DC voltage is initially equalized and stored by means of capacitors prior to being transmitted to a device like IGBT (Insulated Gate Bipolar Transistor). The mechanisms that may output this DC voltage with different phase angles in a manner closer to sine waves and may adjust the amplitude of this waveform, its peak points as well as voltage thereof are called drivers. However, these devices are known not only as drivers but also as inverters, frequency inverters, speed controllers, etc. in the market. All names mentioned above are used for the same product. The motor drive circuit (9) comprises a control circuit that generates PWM (Pulse Width Modulation) signals and sends these signals to motor phase ends, wherein said control circuit further comprises control software algorithms. Generated PWM (Pulse Width Modulation) signal also determines the activation and deactivation of the motor as well as whether voltage shall be transmitted to drive circuit ends or not. Said control operation is performed automatically by means of a separate automatic control circuit comprising software algorithms. Drive circuit performs switching on the phase end of the motor based on the control signals sent to the drive circuit. In other words, said circuit either transmits the voltage to phase ends or interrupts it which will activate the motor. This switching frequency allows the motor to speed up, slow down or run at a fixed speed. It either stops or begins to revolve in the opposite direction. Said circuit further utilizes a software that calculates and controls how many signals it will generate, along with an electronic control circuit.

Five sensor groups (4.1, 4.2, 4.3, 4.4, 4.5) are positioned at certain intervals on the outer cage (4). Sensors are also known as detectors. Sensor is the general name given to apparatuses that convert physical or chemical quantities such as heat, light, humidity, sound, pressure, force, electricity, distance, acceleration and pH into electrical signals. Limit switches, magnetic sensors and/or infrared sensors and/or inductive proximity sensors and/or radar sensors and/or ultrasonic distance sensors may be used for measuring distances. In the inventive mechanism (6), sensor groups (4.1, 4.2, 4.3, 4.4, 4.5) are utilized in order to determine distances. In the inventive power plant (1), said sensor groups (4.1, 4.2, 4.3, 4.4, 4.5) are utilized in order to determine the location of the mechanism (6) which is continuously in motion. When the mechanism (6) reaches to a point that is in close proximity of the upper point of the outer cage (4), it is detected by means of the fourth sensor group (4.4) and accordingly, carrying motors (3) are decelerated through the signals sensed. It is ensured that the carrying motor (3) and accordingly the moving mechanism (6) are brought to a complete stop by means of the fifth sensor group (4.5). After the mechanism (6) is stopped completely, carrying motors (3) begin operating in the opposite direction, thereby moving the mechanism (6) downwardly.

The mechanism (6) which moves in the downward direction, moves by accelerating towards the third sensor group (4.3). When the movement in the downward direction is being commenced, carrying motors (3) are operated in a setting that is close to the highest rev speed. Because a downward launching operation is performed by means of high rev speed. There is no further situation that necessitates high torque except for friction. Gravitational force provides positive support for the movement in the downward direction. Carrying motors (3) are not required to exert high power. In particular, Outrunner BLDC motors (brushless DC motors with fixed central shaft and externally rotating rotor) may accelerate quite easily. After the mechanism (6) is sensed by the third sensor group (4.3), motor drive circuit (9) and carrying motors (3) are deactivated. In said deactivation process, phase ends of the carrying motor (3) are set to open circuit mode. In an alternative embodiment of the present invention, carrying motors (3) are moved away from motor linear gears (13) by means of the servo/linear motor (14) in a manner in which said carrying motors (3) do not come into contact with motor linear gears (13). Subsequently, as the mechanism (6) is accelerated, it moves in the downward direction with the effect of kinetic energy and through the influence of gravity. Said mechanism (6) is left for a decline in the downward direction with the acceleration of gravity by means of accelerating the mechanism (6) through said movement in the downward direction.

Mass size of the carrying motor (3) utilized in the inventive power plant (1) is in direct proportion to the mass size of the multistage generator (2) which will be used therein. It is possible to lift up the mechanism (6) which has high mass weight by means of small size carrying motors (3). A pulley system or a system that comprises a single motor, two motors, three motors and four our motors may be used in the design of the system. However, lifting operation is performed with four rotors rotating externally, i.e. by means of an outrunner carrying motor (3) in order to create a durable, balanced system that does not skip thread on a linear gear and does not suffer from a mechanical failure. Thus, high torque can be obtained from outrunner carrying motors (3). The outrunner motor has a fixed central shaft and a motor impeller having the largest possible diameter is connected to the outer portion which rotates because its external part rotates. Said connection process is performed in order to achieve high torque. Hydraulic supplements may also be present along with carrying motors (3). Brushless DC (BLDC) motors or different motors may be used for said carrying operation. A carrying motor (3) featuring high torque, low power consumption as well as a low number of revolutions was preferred while selecting the carrying motor (3) in order to ensure that the system operates in an efficient manner. Trying to lift the multistage generator (2) in a rapid manner would result in redundant power consumption. A system that initially accelerates while performing movement in the downward direction and subsequently left to free fall with the effect of gravity after the mechanism (6) is ascended slowly and stopped at the fifth sensor group (4.5) shall allow for generating efficient and high capacity electrical energy.

In an alternative embodiment of the present invention, the mechanism (6) may generate energy with a decline shorter than one meter in a manner in which it may reach to the rated torque of the single generator (20) or the multistage generator (2) when it is released for a free fall after it is lifted to the upper point of the outer cage (4) and stopped thereon.

The system that lifts the multistage generator (2) up may be compared to vehicle lifting mechanisms. For instance; a 4-kilowatt motor is sufficient to lift a 4-ton vehicle in average. Additionally, however, upward lifting operation may also be carried out by means of hydraulic or pneumatic systems.

Third sensor group (4.3) is positioned so as to ensure that it is $$\frac{5}{14} \times h$$

away from above and $$\frac{9}{14} \times h$$

away from below by considering the distance between the fifth sensor group (4.5) and first sensor group (4.1) as "h". Said distances are explicitly illustrated in FIG. 3. Aforementioned distance is for achieving optimal efficiency. The mechanism (6) is accelerated as far as $$\frac{5}{14} \times h$$

distance from the apex of the system in a top-down direction through carrying motors (3) by means of the distance determined. Thus, the mechanism (6) gains kinetic energy in addition to potential energy thereof. Once the mechanism reaches to the distance determined, motors are deactivated and the multistage generator (2) is activated. Accordingly, multistage generator (2) will generate electricity at the remaining $$\frac{9}{14} \times h$$

distance and transmit it to external environment. Third sensor group (4.3) senses the mechanism (6) while the mechanism (6) is moving from the top to the bottom in the downward direction, and accordingly deactivates carrying motors (3). Subsequently, being accelerated by means of carrying motors (3), the mechanism (6) begins declining in the downward direction by means of the velocity provided by acceleration process, i.e. with the effects of kinetic energy and gravitational force. Third sensor group (4.3) is not utilized in an alternative embodiment of the present invention. The mechanism (6) is lifted up by means of carrying motors (3) and said carrying motors (3) are deactivated when the mechanism is at the uppermost point of the outer cage (4). In said alternative embodiment of the present invention, the mechanism (6) is released to free fall with the effect of gravitational force solely and without performing any acceleration process, thereby picking up speed, and energy generation is performed subsequently by switching generator's phase ends to closed circuit position. Namely, the mechanism (6) will accelerate as from the uppermost point of the system in the downward direction with the effect of gravity, thereby generating energy. However, the mechanism (6) is required to accelerate as much as $$\frac{5}{14} \times h$$

distance in order to achieve energy generation at the optimal level.

Considering rated power, rated torque and weights thereof for the majority of magnet generators, it reaches to a torque value higher than the rated torque in a distance shorter than 1 meter when their mass weighs are multiplied by the gravitational accelerations and when the distance covered while falling downwards is multiplied in meters.

Exemplary Calculation:

TABLE 1

| Generator's data used in the exemplary calculation | |
| --- | --- |
| Rated Power (w) | 10 kw |
| Maximum Power (w) | 13 kw |
| Rated Revolutions Per Minute (RPM) | 150-170 rpm |
| Upper Net Weight (kg) | 180 kg |
| Initial Torque (N × M): | 1.28 Nm |
| Rated Torque (N × M): | 561.7 Nm |

Torque of the generator having tag values when it is released for free fall and fell for 1 meter:

180 kg×9.81 (gravitational acceleration)×1 (meter)
=1765.8 kgm or Nm. (Newton meter)

As it is seen, it reaches to a torque value that is higher than 3 times of the rated torque. In such case, it reaches to the rated torque even at a 30 cm fall, and it can be started to draw current to the external environment by closing the phase ends of the generator.

Two or more multistage generators (2) may be utilized for an alternative embodiment of the present invention. Since the number of phases will increase when using more than one multistage generator (2), mechanism phase outputs (17) are to be adjusted based on the number of phases.

After the mechanism (6) is accelerated by carrying motors (3) and said carrying motors (3) are deactivated, system begins generating electricity and it is started to draw current by switching the phase ends of the multistage generator (2) to closed circuit position. Phase ends of the carrying motors (3) are switched to open circuit position in the moment before the multistage generator (2) becomes activated or motor drive circuit is deactivated and it is subjected to free fall under the influence of gravitational force prior to switching the phase ends of carrying motors (3) to open circuit position along with the multistage generator (2). Thus, it is ensured that regeneration energy is generated in carrying motors (3) in the generator mode. To that end thereof, phase ends of carrying motors (3) that switch to the generator mode are disconnected from motor drive circuits (9) and connected to the charge control unit (12), and accordingly the charging process of the battery (7) group is performed by means of the charge control unit (12). Charge control unit (12) recharges the battery (7) group when their charge is low by checking the charge state of the battery (7) group in the predetermined voltage range. Once the battery (7) reaches to full charge, it terminates the recharging operation. In such a case, phase ends of carrying motors (3) once again function as open circuit.

Figure 54:
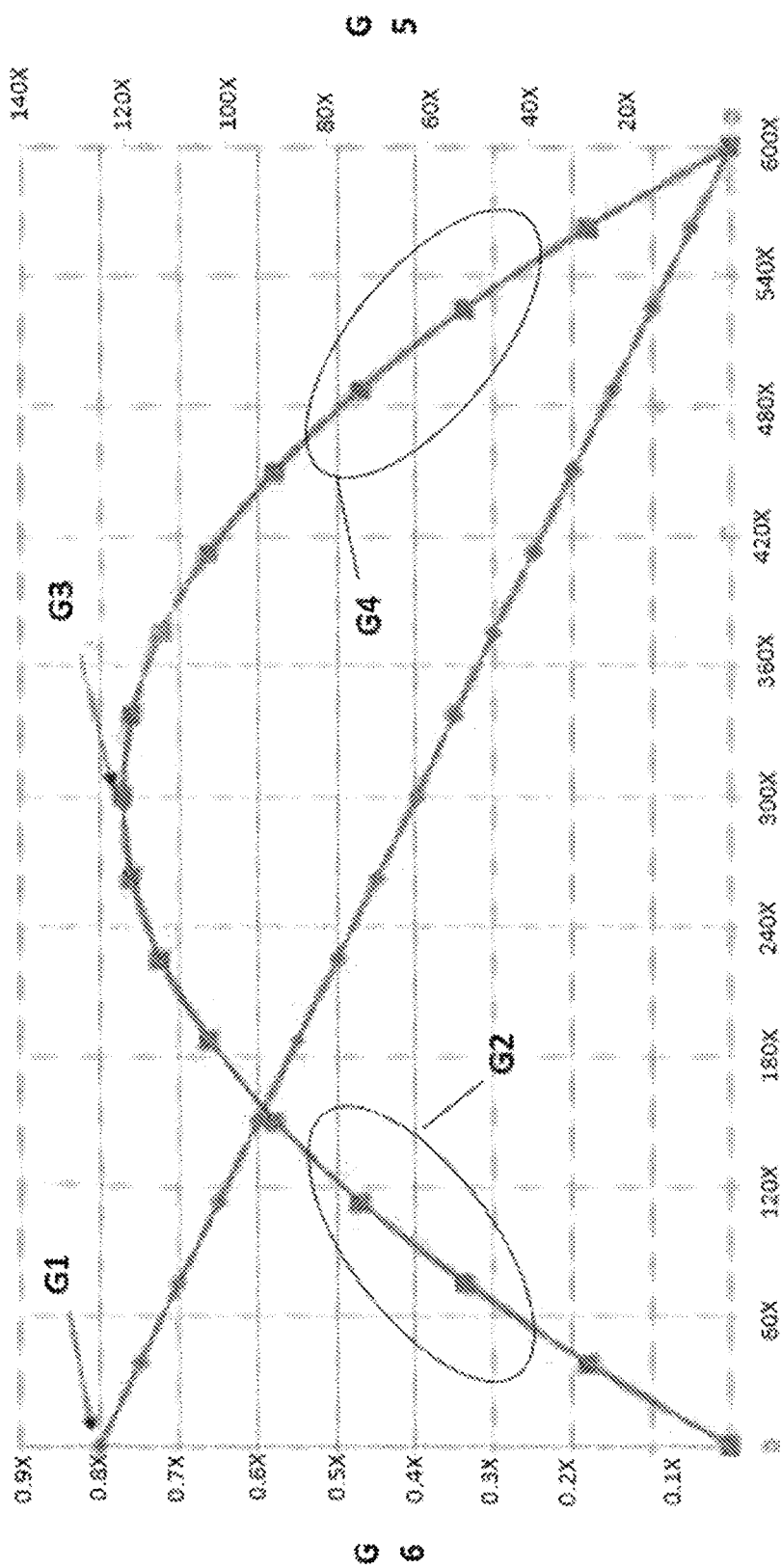
FIG. 54 illustrates the diagram showing speed, torque and power consumed by carrying motors (3).

As it is observed in FIG. 54, torque and the amount of consumed power drop at high revolutions for the BLDC (brushless DC motor) carrying motors. Gravitational force acts as an auxiliary power for the carrying motors (3) in the movement performed in the downward direction. No additional force is applied other than the friction force acting as an impelling force applied in the opposite direction to carrying motors (3) during the downward movement of the carrying motors (3). Therefore, a torque at an intensity that would overcome the friction force is enough for carrying motors (3). Hence, the system may be accelerated quite swiftly and will have substantially high acceleration in the downward direction. If it is run at a low revolution rate, multistage generator stator (2.9) and rotor may not reach to a high number of revolutions in opposite direction to one another before the phase ends of the multistage generator (2) switch to closed circuit position. This will reduce the amount of produced electricity. In the first upward operating area of carrying motors (3), torque is high whereas power consumption and the number of revolutions is low as illustrated in FIG. 54. Therefore, the operation of carrying motors (3) in this area is ensured by the control unit in case the operation is performed in the upward direction. In the second downward operating area of carrying motors (3), torque and power consumption are low whereas the number of revolutions is high. Therefore, it is ensured that carrying motors (3) are operated in this area (second downward operating area) in order to enable achieving high acceleration by consuming less power in case the operation is performed in the downward direction.

In case a potential malfunction occurs in the power plant (1), enough distance is allocated in order to prevent the mechanism (6) from colliding with the uppermost point of the outer cage (4) or with the ground portion thereof. Nevertheless, four spiral springs (8) of helical shape are positioned on the upper portion. Said springs prevent the mechanism (6) from colliding with the uppermost point in case of a malfunction, thereby avoiding any potential damage. As four of said springs (8) may be used, the number of these springs may be less or more. Flexible rubber or lubricated cylinder may be used as alternatives to the spring (8) in order to prevent the mechanism (6) colliding with the uppermost or with the lowermost point.

The impeller located at the outer diameter of external rotors of the carrying motors (3) is in contact with the motor linear gears (13). Carrying motor (3) impeller ensures that the mechanism (6) goes up and down by means of the motor linear gears (13). It is ensured that carrying motors (3) are separated from one another as of the $$\frac{5}{14} \times h$$

stage in order to avoid creating a friction force between the motor impeller and motor linear gears (13) while moving downwards from the top. The operation of moving carrying motors (3) away from the motor linear gear (13) is performed by means of the servo/linear motor (14). Servo/linear motor impeller (15) and servo/linear motor gear rack (16) are in contact with each other. Servo/linear motor (14) is fastened on the inner cage (5). Said fastening operation is illustrated in FIG. 15. Carrying motors (3) may perform reciprocating motion, i.e. may move back and forth by means of the servo/linear motor rack (16). Thus, it is ensured that the carrying motors (3) come into contact with the motor linear gear (13) or moved away. Electrical controls of aforementioned operations involving moving away and bringing into contact therewith are performed by the control unit (12) through the drive circuit included in the servo/linear motors (14). In an alternative embodiment of the present invention, bringing carrying motors (3) into contact with motor linear gear (13) and moving said motors away may be achieved by means of a system comprising electromagnets and springs (8) instead of servo/linear motors (14).

In the present invention, generator linear gears (11a, 11b) and motor linear gear (13) are utilized in order to ensure the up-down motion of the mechanism (6). The mechanism (6) performs a climbing movement in the upward direction over the motor linear gear (13). Acceleration in the downward direction is performed with the aid of motor linear gears (13). In an alternative embodiment of the present invention, a chain system may be utilized instead of motor linear gears (13) and generator linear gears (11a, 11b).

A battery (7) is utilized in the mechanism (6) included in the inventive power plant (1). Said battery (7) provides the energy consumed for performing up and down motion of the mechanism (6). For an alternative embodiment, said energy may also be supplied from the electricity grid. However, battery (7) is used by being positioned on the mechanism (6) in order to ensure that the potential energy of the mechanism (6) increases through the mass gain stemming from height and to enable the construction of the inventive power plant (1) even in locations without electricity grid. The battery (7) is required to be integrated into the system when it is full. The system will begin to function with the battery (7) which is integrated into the system when it is at full charge capacity, and the system will continue generating its own energy by utilizing the gravitational force. While the electricity generated through the system may be stored, it may also be consumed directly. As the system may be unique to each vehicle, machine, apartment house (housing) or to apartment complex, it is also possible to design larger systems for social areas. In addition to aforementioned areas of usage, the present invention may also be used in an integrated manner in aircrafts, vessels, trains, trams, manned-unmanned aerial vehicles, electric cars, busses, minibuses, trucks, construction equipment, inside or alongside of special devices supplied with electricity, cell towers, lighting posts, irrigation and sprinkler systems, in elevators utilized in mines. The present invention may further be utilized on extraterrestrial planets, in observation and communications satellites located within the atmosphere and have gravitational effects therein (system may accordingly be designed by calculating gravitational acceleration based on the altitude and gravitational conditions in which it shall be utilized, and in spacecrafts (by creating artificial gravity and activating any time when the system declines and by deactivating every time it begins to ascend).

Carrying motors (3) which move slowly from bottom to top along the linear gear racks, and mechanism phase output (17) ends of the multistage generator (2) of which rotor and stator rotate in an opposite direction to one another until said motors reach to the uppermost point are enabled during the operation of the inventive power plant (1). In other words, no current is drawn, and electricity is not generated. Therefore, carrying motors (3) carry only the mass weights of the multistage generator (2), their own mass weights along with the mass weights of other components located on the mechanism (6).

Impellers are positioned on the rotor shaft (18) and stator shafts (19) included in the multistage generator (2). Said impellers are in contact with the generator linear gears (11a, 11b) which are positioned to be in opposite direction to each other. Thus, a motion of opposite direction occurs in the rotor and stator (2.9) of the multistage generator (2). The system comprises bearings connected to the rotor shaft (18) and stator shafts (19), wherein said bearings ensure that multistage generator (2) remains stable and is balanced while it is being carried in upward and downward directions. Impellers located on the rotor shaft (18) and stator shafts (19) included in said generator (2) are mounted on a position in which shafts are in the closest proximity to the multistage generator (2) body. The purpose of this positioning is to prevent any potential stretching that may occur in shafts due to weights. Diameter of said impellers are large enough in order not to prevent the contact with generator linear gears (11a, 11b) and to ensure that they may function smoothly and may possess enough resistance to breaking. However, these should not have an excessively large diameter. The reason is that it may reach higher number of revolutions while going down from top to bottom. Thus, it will generate more electrical energy by achieving higher number of revolutions while descending from the same height. In an alternative embodiment of the present invention, a second set of bearings may be positioned on the outer portion of said bearings in a reciprocal manner thereof, and the movement of said bearings may be ensured within a "U" shaped carrying slideway in order to ensure that the system remains in a more balanced manner.

Diameter of impellers (10a, 10b) mounted on the rotor shaft (18) and stator shaft (19) of the generator utilized in the inventive power plant (1) is designed so as to ensure that it does not exceed radius of said shafts (18, 19) between the thread end of the impeller and the point that will come into contact with the shaft.

The mechanism (6) stops when it reaches to the fifth sensor group (4.5) on the motor linear gear (13) that is in contact with the impellers connected to the motor shafts. Carrying motors (3) which are brought to a stop by means of the control circuit and drive circuits, are released for a free fall by cutting their power. The mechanism (6) begins to fall with the effect of the whole weight of the system and the gravitational acceleration. When the phase ends of the multistage generator (2) are switched to the closed-circuit position, the multistage generator (2) will begin generating electricity, and accordingly will decelerate with back electromotive force based on the amount of the current drawn. A current limiter is used in order to ensure that said deceleration is not excessive. In case a current limiter is not used, and if excessive amount of current is drawn, then the system will stop with the braking action occurring in the moment of regeneration. The current limiter connected to the multistage generator (2) not only prevents the complete braking action due to drawing excess current but also the protect multistage generator (2) windings against burning out.

As an alternative method for the counter EMF utilized in the braking of the multistage generator (2), phase ends which transfer electricity to the external environment, switch to open current position when the mechanism (6) reaches to the second sensor group (4.2), external environment electricity is cut, and accordingly dynamic braking is performed by disrupting the sinusoidal waveform through applying DC voltage at a low amount to ends of windings. In an alternative embodiment of the present invention, a rheostat may be connected to the phase ends of the generator (2) instead of implementing aforementioned method, thereby drawing high current and performing a braking action without colliding with the bottom portion. Since the electricity generated in braking processes performed by using counter EMF and rheostat will be used for braking, it cannot be transmitted to the external environment.

In an alternative embodiment of the inventive power plant (1) that generates electricity by using gravitational force, three, four or six of same structure are positioned adjacent to each other so as to continuously transfer energy to the external environment. For instance; just as the phase diagram of a three-phase alternative current system, when three of the inventive power plants (1) are positioned adjacent to one another, one of the mechanisms (6) included in each power plant (1) may be descending while the other one is ascending. While two out of every three mechanisms (6) are ascending, one of them is descending or while one of them is ascending the other two are descending. When the control software is adjusted in such manner, energy can be transferred continuously to the external environment. This system may also be designed as a four-phase or five-phase system instead of three-phase. Just as the power of a vehicle is transferred from various number of pistons to the same crankshaft, energy may be continuously transferred to the external environment by adjusting the designs of three or more mechanisms (6) through the control software so as to ensure that they have descending or ascending positions at different locations and stages.

$$Ep = m \cdot g \cdot h$$

(Potential Energy=Mass×Gravitational Acceleration (9.81)×Height)     Equation-1 Potential Energy Equation Equation-1 shows the potential energy equation. As it can be understood from this commonly known equation, a gain in mass increases the potential energy gain. For instance; respective dimensions and accordingly the mass should be increased in order to increase the capacity of the multistage generator (2) used in the inventive power plant (1). Aforementioned increase in the dimensions of the multistage generator (2) is a beneficial one. Electrical phase ends of the multistage generator (2) shall be in open circuit position since the carrying motors (2) carry only the mass weight of the multistage generator (2) while carrying it in the upward direction. Therefore, this will not impose any additional difficulties. In spite of said increase in the dimensions of the multistage generator (2), enough carrying capacity and power can be achieved with only a little dimensional increase in four carrying motors (3) that carry the generator upwards in a balanced manner. Higher amount of energy is generated since the mass increases when descending in the downward direction. Because the mass "m" mentioned in Equation-1 increased. Even though what is disclosed above is potential energy gain due to height, electrical energy is generated by taking advantage of the potential energy created while the mechanism (6) is descending in the downward direction. The rotation of the rotor and stator (2.9) of the multistage generator (2) in opposite directions, and with the movement of impellers which are positioned on the rotor shaft (18) and on the stator shaft (19), on the generator linear gears (11a, 11b) placed in the opposite direction on right and left sides allow for creating a rotational movement in the opposite direction, thereby generating high amounts of electrical energy.

Multistage generator (2) used in the inventive system that generates electricity through gravitational force is comprised of multistage generator stator (2.9), stator shaft (19), rotor, rotor shaft (18), bearing (2.8), rotor fixing screw (2.10), rotor shaft fixing screw (2.13) and cover (2.5). Said rotor comprises two rotor arrangements which are the inner rotor (2.12) and the outer rotor (2.11). Phase ends (2.7) are being positioned at the inner side of the stator shaft (19) in order to draw current from the windings of the multistage generator stator (2.9) to the receivers located in the external environment.

The system that comprises of the inner rotor (2.12) which is positioned in a nested manner within the outer rotor, and the outer rotor (2.11) is called the rotor group. A number of stage position lines are located on the outer portion of said rotor group in order to perform the positioning based on the number of stages determined. The line or the marking located on the outer rotor (2.11) which is located at the first stage is called $1^{st}$ Stage Position Line (2.4.1). Analogously, $2^{nd}$ Stage Position Line (2.4.2) and $3^{rd}$ Stage Position Line (2.4.3) are located respectively on the outer rotor (2.11) located at the second and third stages. Moreover, rotor screw socket (2.17) is positioned inside the outer rotor (2.11) in order to fix the rotor groups, present at every stage. Thus, rotor groups which are present at every stage, may move together as a single rotor. The purpose of providing a multistage structure is to increase the number of phases output to the external environment. When the number of phase ends increases, the current shall decrease and accordingly, the costs for inverter circuits which control the current when used in the external environment, shall be reduced substantially.

The multistage generator stator (2.9) is positioned between the inner rotor (2.12) and the outer rotor (2.11). Thus, the pathway of the magnetic flux shortens, thereby increasing the magnetic field and reducing losses. A shaft clearance is located in the middle portion of the stator. Said shaft clearance has a shape and size so as to ensure that the stator shaft (19) may be passed therethrough. A keyway (2.16) is positioned on said shaft clearance so as to ensure that the wedges (2.15) located on the stator shaft (19) may be inserted therein. Wedges (2.15) located on the stator shaft (19) and multistage generator stators (2.9) rotate together with the shaft. Thus, the windings of the multistage generator stator (2.9) are prevented from rotating on their own. The voltage induced on windings is initially drawn to the mechanism phase ends (17) and subsequently to the external environment over the brush-slip ring (21) system by means of the multistage generator phase output (2.7) located at the inner portion of the stator shaft (19) of the generator.

The amount of electrical current from the external environment is controlled by the control unit (12). Current control varies depending on the capacity of the multistage generator (2) and prevents the windings from burning out. The approach of the multistage generator (2) to the lowermost point in the system is detected by means of the sensor groups (4.1, 4.2, 4.3, 4.4, 4.5) and accordingly, rheostats become activated based on the current drawing condition of the receivers located at the external environment and brake the entirety of the system, thereby preventing it from colliding with the lowermost point. Nevertheless, rubber bump stops, spiral springs (8) and shock absorbing pistons are utilized as a precaution on the lowermost and uppermost points of the system. Thus, the system may operate as quiet as possible between the lowermost and the uppermost points of the system without colliding with any portion. A brush-slip ring (21) system is utilized when drawing the electricity generated with the system to the external environment. The brush-slip ring (21) system is used for drawing energy from the components rotating around their own axes. The energy generated in the system is required to be drawn from aforementioned brush-slip ring (21) as well as from the mechanism (6) moving in the upward and downward directions. A long cable is connected to the phase outputs. Said cable moves in the upward and in the downward direction together with the mechanism (6) just as it occurs in elevator cabins. Thus, the electrical energy present at the mechanism phase outputs (17) may be drawn to the external environment directly over the aforementioned cable. In an alternative embodiment of the present invention, brushes are connected to the mechanism phase outputs (17) in order to draw electrical energy to the external environment. Said brushes come into contact with busbars and move together with the mechanism (6) which moves in the upward and downward directions, thereby transferring the generated electrical energy to the external environment through the busbars. In an alternative embodiment of the present invention, bearings in the number of mechanism phase outputs (17) are utilized instead of the brushes (20.8) located at said mechanism phase output (17) in order to prevent the brushes from wearing out due to friction. These bearings may be used directly, however, they may also be cladded with a material with high self-conductivity such as copper or silver in order to prevent the formation of any resistance and to prevent heat generation. Generated electrical energy may be transferred to busbars by means of connecting mechanism phase outputs (17) to the center of bearings. No abrasion occurs in the brushes (20.8) since bearings provide energy transmission by rotating and by coming into contact with the busbars. Bearings have a longer physical life span when compared to brushes (20.8).

Multistage generator stator (2.9) is constituted by means of stacking siliceous sheet metal plates. After siliceous sheet metal plates (2.26) are stacked, flange sheet metal plate (2.30) is positioned at both ends of the multistage generator stator (2.9) in order to keep them in a uniform manner. After siliceous sheet metal plates (2.26) are stacked by using stud bolt (2.31), flange sheet metal plate (2.30) is positioned at both ends thereof. Said flange sheet metal plate (2.30) is made of a rigid material such as steel and Delrin. Moreover, said flange sheet metal plate (2.30) and stud bolts (2.31) ensure that each siliceous sheet metal plate (2.26) group is fastened to one another. Stud bolt clearances (2.32) are positioned on flange sheet metal plate (2.30) and siliceous sheet metal plates (2.26) so as to pass aforementioned stud bolts (2.31) therethrough. Flange sheet metal plates (2.30) located at the both ends of the multistage generator stator (2.9) are fastened to one another by means of the countersunk bolt (2.27) inserted to stud bolts (2.31). Said countersunk bolt (2.27) is embedded into the flange sheet metal plate (2.30). Thus, the outer varnish layer does not get damaged due to snagging of coil wires to bolts during the winding process. After coil wires are wound around the siliceous sheet metal plates (2.26), phase ends are drawn outside through the stator shaft (19). The winding operation of coil wires may be performed as a whole, after the siliceous sheet metal plates (2.27) and countersunk bolt (2.27) are fastened to one another. Alternatively, coil winding may also be performed easily on the flange sheet metal plate (30) located at both ends prior to being joined after siliceous sheet metal plates (2.26) and stud bolt (2.31) are fastened to one another. Subsequently, flanges are joined together. Aforementioned application not only provides practicality in the winding step of the generator but also prevents the non-conducting varnish layer of the coil wire from getting damaged while coil wires are inserted through narrow cavities between the sheet metal plates. The crucial point to be considered herein is that stud bolts (2.31) should be long at both ends in order for being attached to the flange sheet metal plate (2.30). Stud bolt (2.31) portions that remain outside should either be temporarily coated with a lubricous type of varnish or be enclosed within a thin plastic material in order to ensure that coil wires do not get damaged during the winding process. After all winding processes are complete, the varnishing operation is performed on the stators of which single generator phase outputs (20.2) are taken outside through the shaft. Subsequent to the varnishing process, stators subjected to drying process become ready for being assembled. After coil wires are individually wound to the siliceous sheet metal plate (2.26) segments, it is installed to the flange sheet metal plate (2.30). Thus, the winding process may be performed easily and rapidly. Segmental structure of the siliceous sheet metal plates (2.26) will provide speed and practicality during the production step of cutting sheet metal plates, be it performed through cutting by press or through wire erosion cutting method. This will also decrease the likelihood of manufacturing faulty products.

Each rotor stage in the multistage generator (2) system is composed of rotor group having two rotors which are the inner rotor (2.12) and the outer rotor (2.11). Since inner rotors (2.12) and outer rotors (2.11) of all three stages perform their movement as a whole, synchronizing the number of revolutions therebetween is not necessary.

While the windings of the multistage generator stator (2.9) are positioned at one side between the rotor group included in the multistage generator (2) system, cooling channels (2.14) are positioned at the other side thereof. Analogously, said cooling channels (2.14) are also present in every repeating stage. The cooling operation of the multistage generator stator (2.9) and the rotor group which are in the final stage, is performed by means of the cooling channels (2.14) located in the inner portion of the cover (2.5). Thus, an efficient cooling operation is achieved at every stage.

In the production step of the multistage generator system (2), the rotor shaft (18) is fixed on the rotor $1^{st}$ Stage (2.3.1) by means of the rotor shaft screws (2.13). Windings of the multistage generator stator (2.9) is positioned between the inner rotor (2.12) and the outer rotor (2.11) which constitute the rotor $1^{st}$ Stage (2.3.1). The wedge (2.15) located on the stator shaft (19) corresponds to the keyway (2.16) present on the multistage generator stator (2.9). The cavity through which the 1st Phase windings that are located within the multistage generator stator (2.9), are brought to outside as the initial end of the windings of the single generator phase output (20.2), is the 1st Phase output. Said phase output and the beginning of the S (south) pole of the corresponding magnet are intersected in a superimposed manner. Multistage generator stator (2.9) and the rotor that are available in every stage are positioned in this manner. Furthermore, a stage position line is drawn at the point in which the intersection is located. Angle ratios between each stage is adjusted subsequent to aforementioned processes. While the rotor $2^{nd}$ stage (2.3.2) is being placed, it is positioned by being rotated to the left or to the right relatively to the rotor $1^{st}$ Stage (2.3.1). This rotation angle is determined based on the number of phases and stages of the multistage generator system to be utilized. When the generator is considered as a rotating disk, the entirety thereof is $360°=2\pi$. While the rotor which is available in every stage, is being positioned, this positioning operation is performed based on the number of stages and phases. If the number of stages is indicated with the letter "s", and the number of phases is indicated with the letter "p", each stage is positioned in proportion to one another with a rotation angle of $2\pi/((s\times p))$ radian or $(360°)/((s\times p))$.

For instance, if three-phase generators are to be used with three stages, then the positioning of phase angle of the stator windings available in every stage is 120°. In other words, it is $2\pi/3$ radian. Since three stages from three phases shall be utilized in case a three-stage generator is used, it will resemble a system with a total of 9 phases. That means it should be rotated by $(360°)/9=40°$ or $(2\pi)/9$ radian. While positioning the rotor and the multistage generator stator (2.9) of each stage, they are positioned by being rotated to the right by 40° or to the left by 40° as a whole based on the positions of the stator shaft (19) and the rotor of the previous stage. Therefore, the upcoming stage should be positioned by being rotated by 40° in the same direction relatively to the previous one. Stator (9) is positioned just like in the first stage after the rotor $2^{nd}$ Stage (2.3.2) is rotated to the left or to the right side by approximately 40° relatively to the rotor $1^{st}$ Stage (2.3.1). In the following step, rotor $3^{rd}$ Stage (2.3.3) is positioned by being rotated in an angulated manner by 40° relative to the rotor $2^{nd}$ Stage (2.3.2) and by 80° relative to the rotor $1^{st}$ Stage (2.3.1). Stage position lines are provided on the upper portion of the rotor group in order to facilitate this positioning process. In case the multistage generator (2) is single stage, then it will have 3 phase outputs. 3 brushes and 3 busbars utilized in the brush-busbar system while transferring the electricity to the external environment. In case said generator has 2 or 3 stages, then the brush-busbar system is designed to have 6 brushes and 6 busbars or 9 brushes and 9 busbars. In case electricity is drawn to the external environment by using energy cable and without utilizing the brush-busbar system, then the cable should be of 3, 6, 9 . . . phases as the occasion requires. Brush-busbar or cable should be utilized according to the number of single generator phase outputs (20.2). For instance; three-phase stator windings are used in each stage of a three-stage generator (2) system. While the rotor shaft (18) and windings are rotating in opposite directions to each other, electricity induction occurs in each of the three-phase stator windings included in each stage.

Brush-slip ring (21) system is integrated to the stator shaft (19) since both the rotors and the multistage generator stator (2.9) are in motion within the multistage generator (2). Electrical energy generated through the brush-slip ring (21) system is transferred to the external environment. Multistage generator stator (2.9) and the rotor rotate in opposite directions to each other. Thus, 8 times more energy is generated instantly in comparison with the conventional generator systems. As multistage system may be used as a multistage generator (2), axial flux single generators (20) with rotating stator (2.9) and rotor may also be utilized. The energy generated herewith is initially transferred to the control unit (12) through the brush-slip ring (21) system, and to the battery (7) thereafter, and accordingly stored herein. The surplus energy which is beyond the need of the battery (7) is utilized as electrical energy by being drawn to the external environment through the energy transmission cables connected to the single generator phase output (20.2) ends or through the brush-busbar system or through the bearing cladded with copper and aluminum alloy and the busbar system that said bearing is in contact with.

Figure 30:
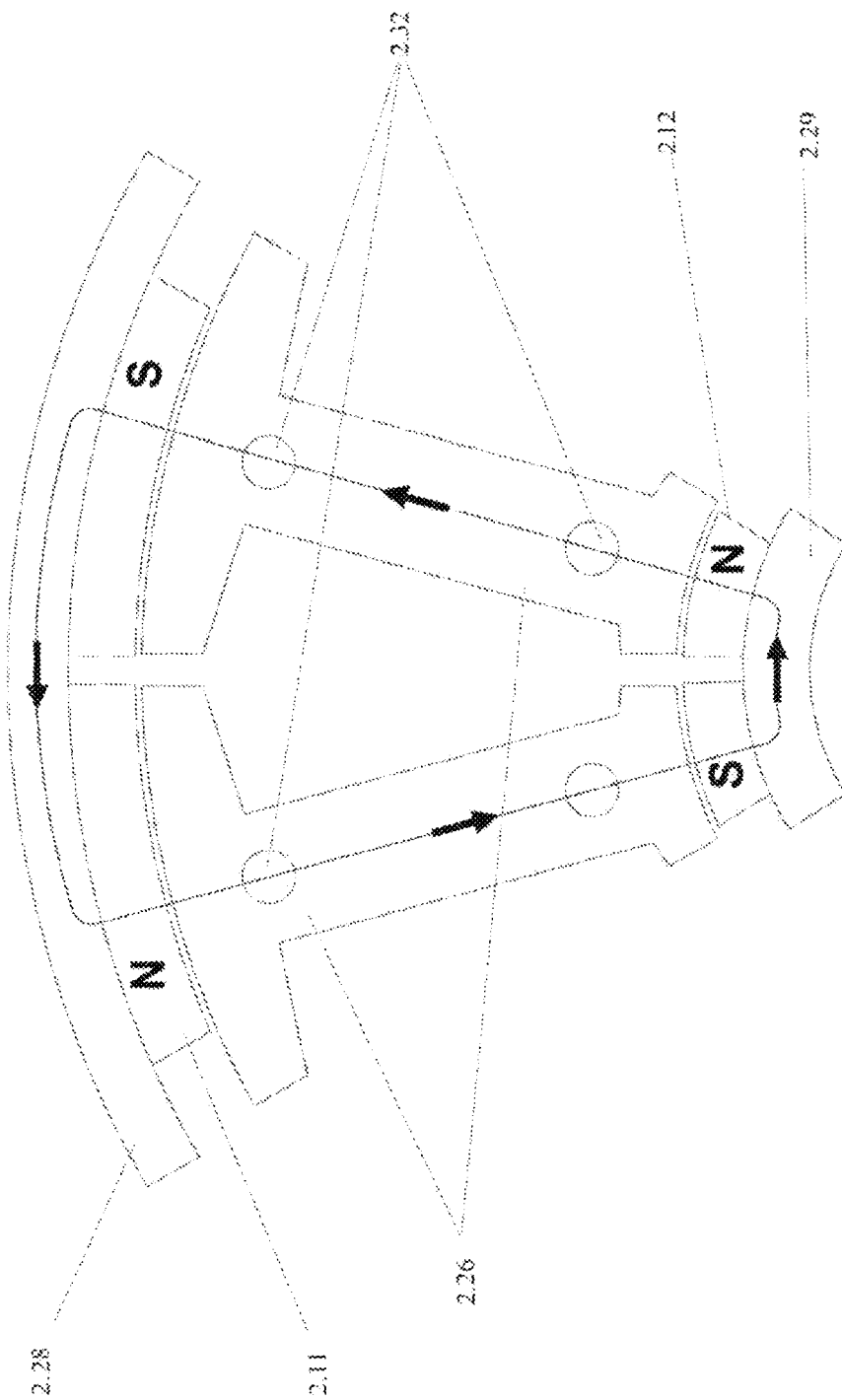
FIG. 30 illustrates the detailed view of the multistage generator stator (2.9).
Figure 33:
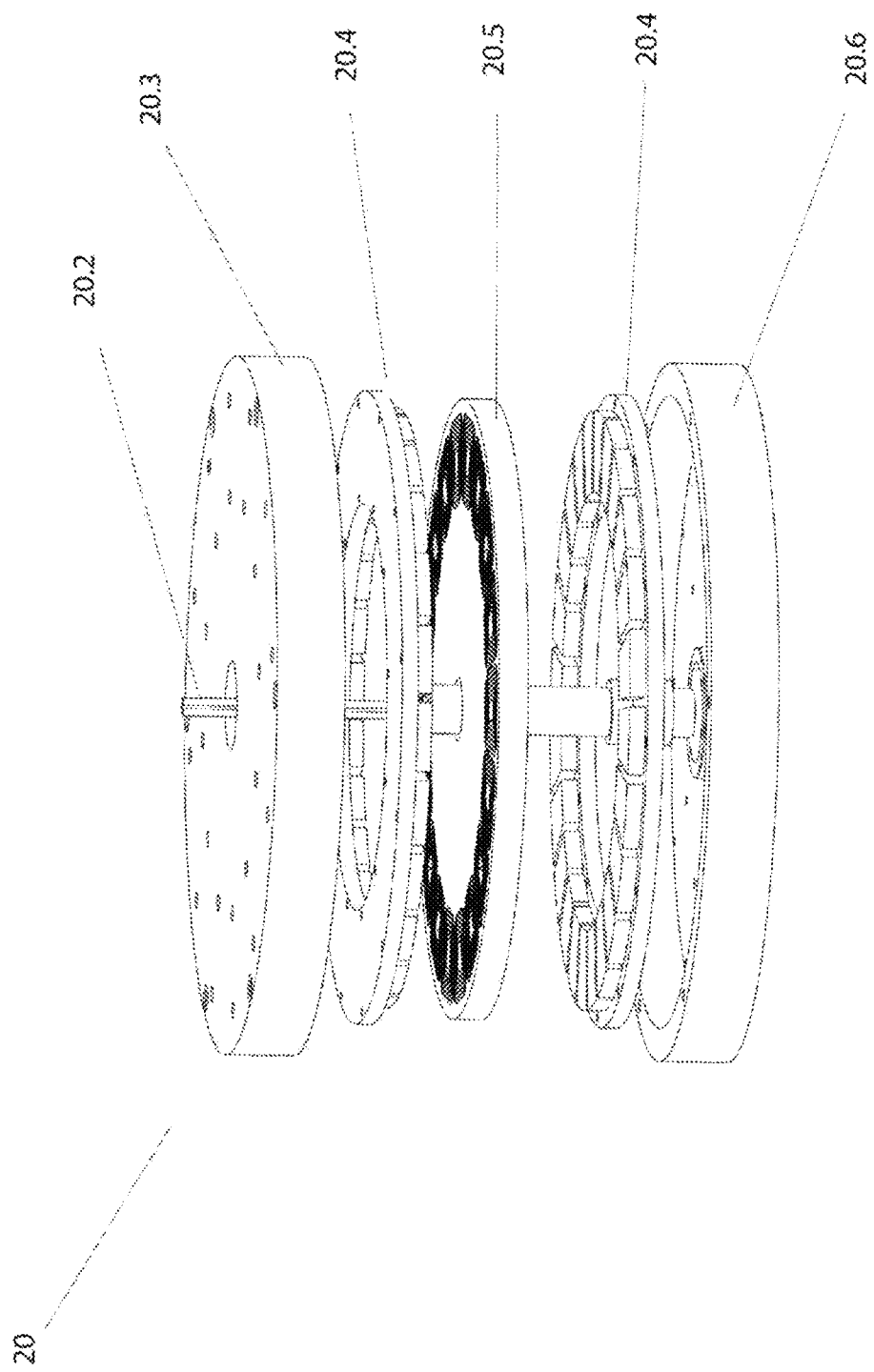
FIG. 33 illustrates the exploded perspective view of the twin-rotor (20.4) single generator (20).
Figure 43:
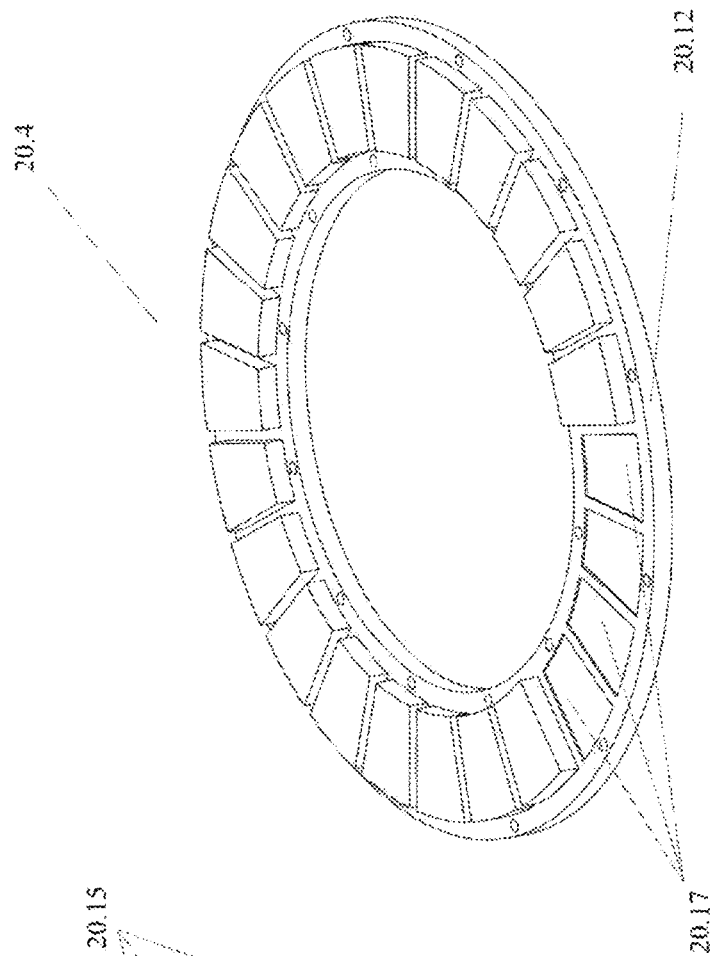
FIG. 43 illustrates the perspective view of the rotor (20.4) used in the single generator (20).
Figure 42:
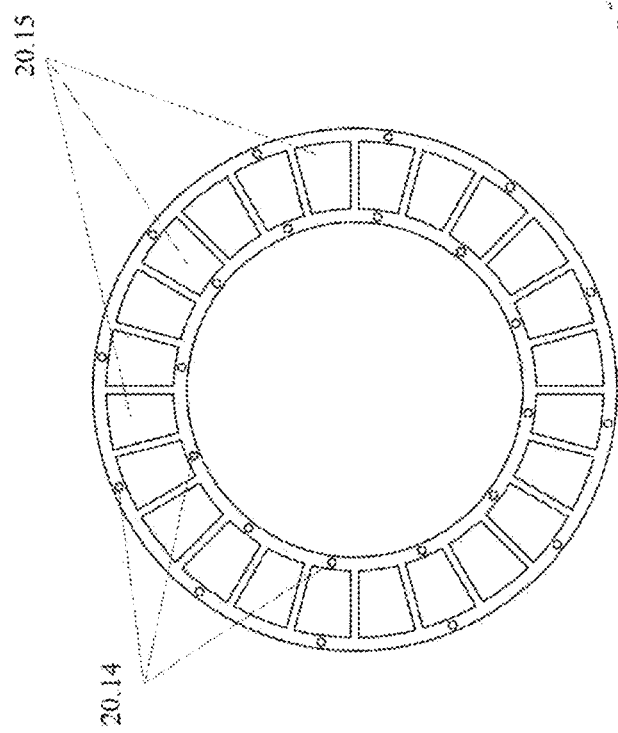
FIG. 42 illustrates the top view of the rotor (20.4) used in the single generator (20).
Figure 44:
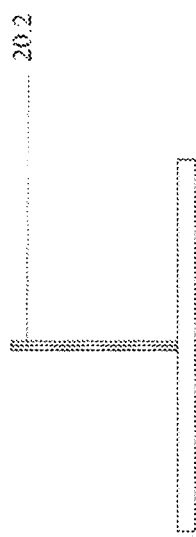
FIG. 44 illustrates the side view of the stator (20.4) used in the single generator (20).
Figure 46:
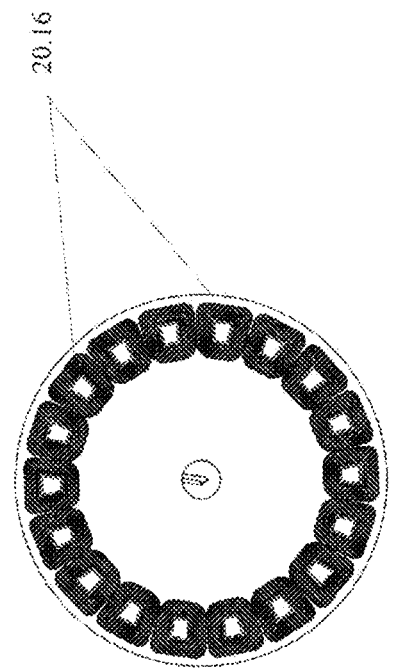
FIG. 46 illustrates the top view of the stator (20.4) used in the single generator (20).
Figure 45:
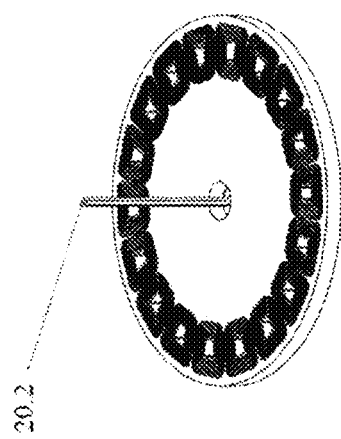
FIG. 45 illustrates the perspective view of the stator (20.4) used in the single generator (20).
Figure 51:
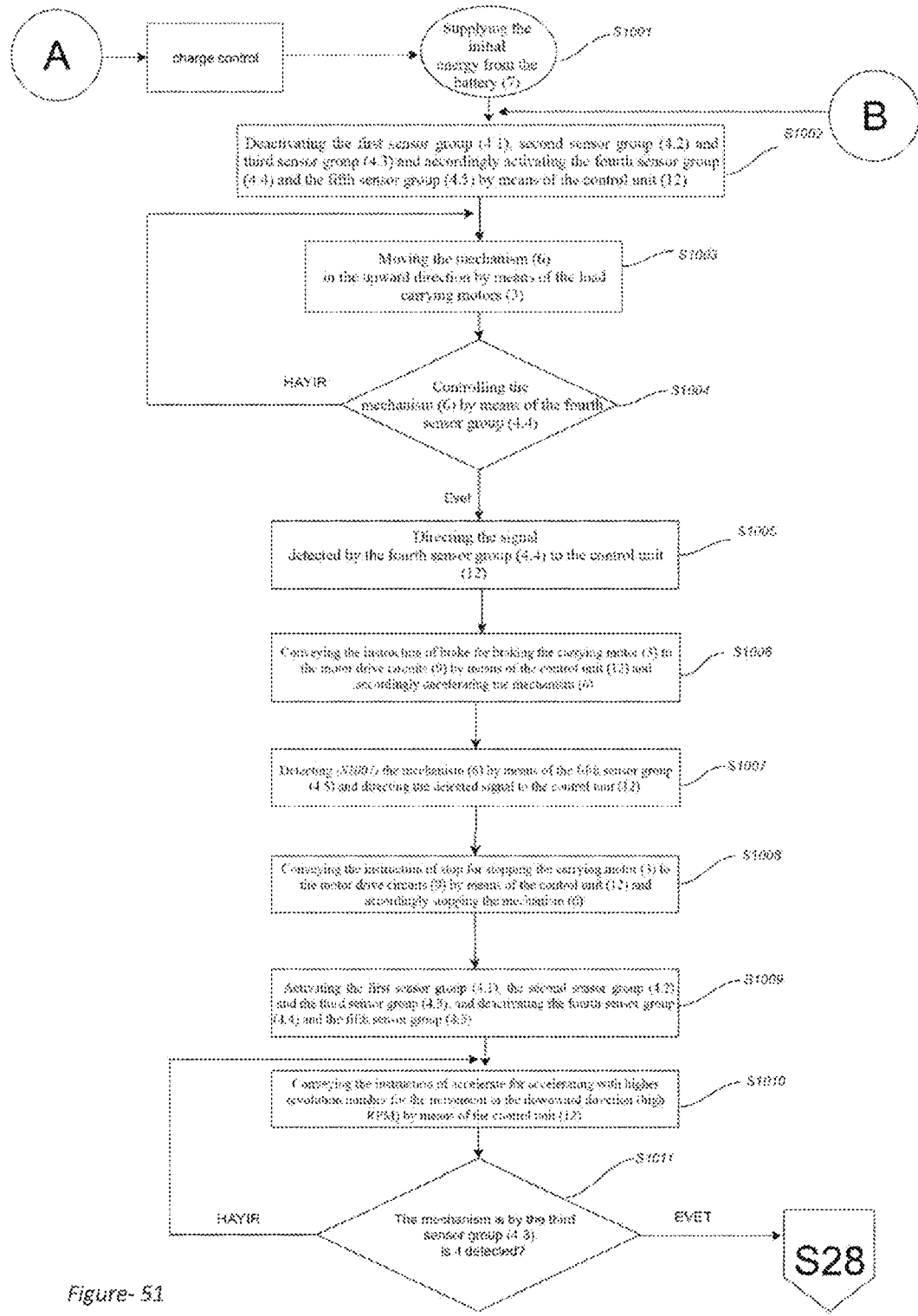
FIG. 51 illustrates the flow chart describing the operating principle of the inventive power plant (1).
Figure 52:
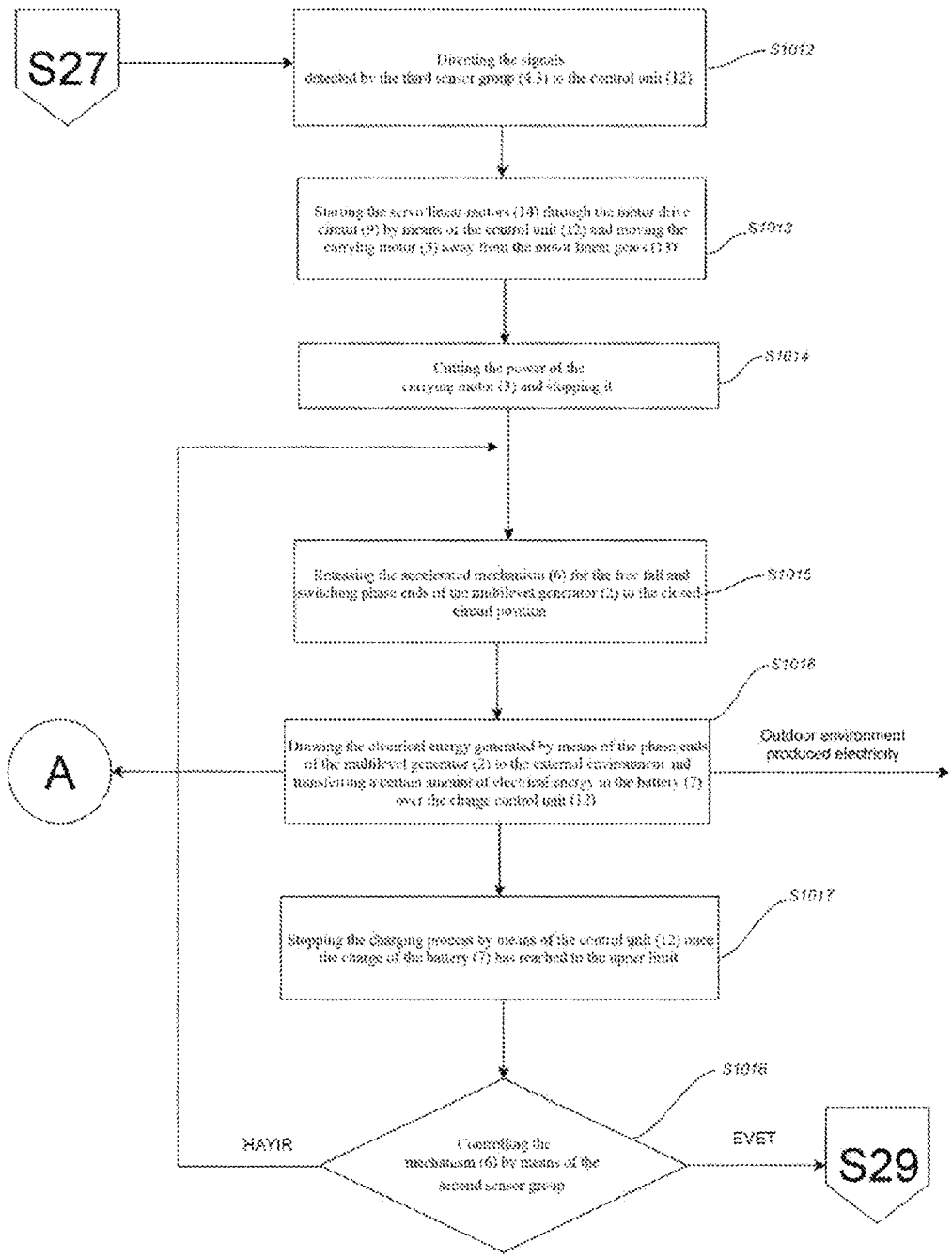
FIG. 52 illustrates the rest of the flow chart describing the operating principle of the inventive power plant (1).
Figure 53:
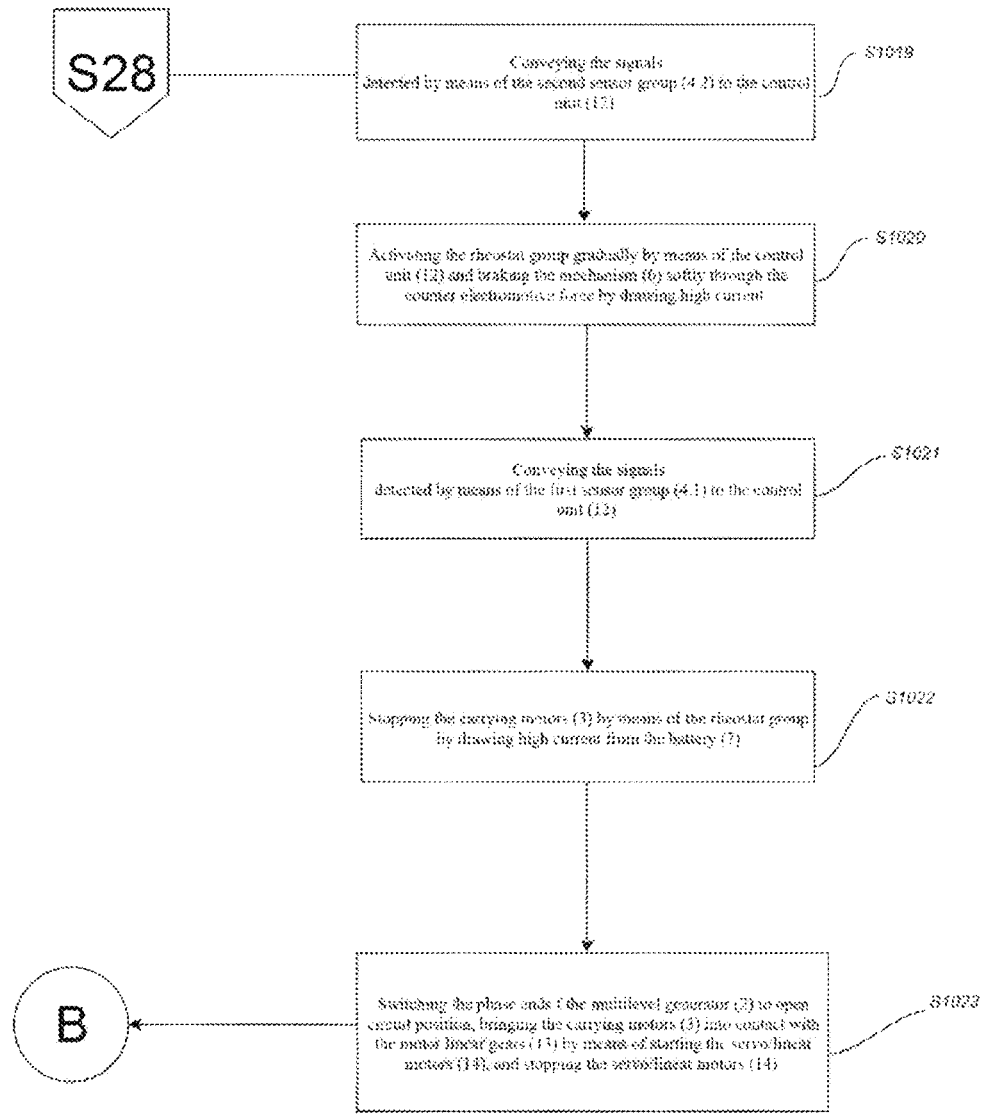
FIG. 53 illustrates the rest of the flow chart describing the operating principle of the inventive power plant (1).

In comparison with conventional generators, high numbers of revolution are not necessary for generating electrical energy as magnetic generators possess a permanent magnetic field. Voltage induction occurs at phase ends even at a quarter revolution. Moreover, the magnetic field completes its track by following a "U" shaped route in systems where the rotor is only internal or in systems where the rotor is only external. Namely, in a magnetic sequence of N-S-N-S . . . , the magnetic field which begins from the N pole, completes its cycle by following the route of; position lines, stator windings, nucleus core and S pole of the adjacent magnet and the steel plate on which the magnets are arranged. This prolongs the passageway of the magnetic field, thereby reducing its effect. Accordingly, low voltage induction occurs. If stator windings remain inside the magnetic field created by the rotor magnets positioned both at the right side and the left side or both on the inner diameter and on the outer diameter, a denser magnetic field is created and accordingly a higher voltage induction is achieved. Because the magnetic field completes the path by following an "I" shaped route. The magnetic force that starts from the N pole of a rotor magnet, runs over the coil wound over the nucleus core corresponding to the force lines and reaches to the S pole of the corresponding rotor magnet. Subsequently, it passes to the steel sheet metal plate, then to the adjacent coil wound over the nucleus core of the N pole of the adjacent magnet and reaches to the S pole of the magnet positioned right across thereof. Concordantly, it reaches to the steel sheet metal plate to which the magnet is connected. In other words, it performs 2 different tasks in one cycle, thereby reducing losses. A dense magnetic field is obtained. Said situation is illustrated in FIG. 30.

In an alternative embodiment of the present invention, axial-flux coreless alternators may be used instead of the nucleus core made of siliceous sheet metal plate. The brush-slip ring (21) system connected to the stator shaft is utilized for transferring the electrical energy at the phase ends coming through the shaft to the slip rings, and for drawing it to the external environment over the brushes (20.8). Hence, it is aimed to create resultant velocity and to generate higher amounts of energy by rotating the rotor and the stator in opposite directions. In an alternative embodiment of the present invention, energy production can be performed by moving only the rotor or only the stator.

Operation principle of a power plant (1) using a multistage generator (2) comprises the process steps of;
Supplying the initial energy from the battery (7) (S1001),
Deactivating the first sensor group (4.1), second sensor group (4.2) and third sensor group (4.3) and accordingly activating the fourth sensor group (4.4) and the fifth sensor group (4.5) by means of the control unit (12) (S1002),
Moving the mechanism (6) in the upward direction by means of the load carrying motors (3) (S1003),
Controlling the mechanism (6) by means of the fourth sensor group (4.4) (S1004),
Directing the signal detected by the fourth sensor group (4.4) to the control unit (12) (S1005),
Conveying the instruction of brake for braking the carrying motor (3) to the motor drive circuits (9) by means of the control unit (12) and accordingly decelerating the mechanism (6) (S1006),
Detecting the mechanism (6) by means of the fifth sensor group (4.5) and directing the detected signal to the control unit (12) (S1007),
Conveying the instruction of stop for stopping the carrying motor (3) to the motor drive circuits (9) by means of the control unit (12) and accordingly stopping the mechanism (6) (S1008),
Activating the first sensor group (4.1), the second sensor group (4.2) and the third sensor group (4.3), and deactivating the fourth sensor group (4.4) and the fifth sensor group (4.5) (S1009),
Conveying the instruction of accelerate for accelerating with higher revolution number for the movement in the downward direction (high RPM) by means of the control unit (12) (S1010),
Controlling whether the mechanism (6) has reached to the $5/14 \times h$ distance or not by means of the third sensor group (4.3) (S1011),
Directing the signals detected by the third sensor group (4.3) to the control unit (12) (S1012),
Starting the servo/linear motors (14) through the motor drive circuit (9) by means of the control unit (12) and moving the carrying motor (3) away from the motor linear gears (13) (S1013),
Cutting the power of the carrying motor (3) and stopping it (S1014),
Releasing the accelerated mechanism (6) for the free fall and switching phase ends of the multistage generator (2) to the closed-circuit position (S1015),
Drawing the electrical energy generated by means of the phase ends of the multistage generator (2) to the external environment and transferring a certain amount of electrical energy to the battery (7) over the charge control unit (12) (S1016),
Stopping the charging process by means of the control unit (12) once the charge of the battery (7) has reached to the upper limit (S1017),
Controlling the mechanism (6) by means of the second sensor group (4.2) (S1018),
Conveying the signals detected by means of the second sensor group (4.2) to the control unit (12) (S1019),
Activating the rheostat group gradually by means of the control unit (12) and braking the mechanism (6) softly through the counter electromotive force by drawing high current (S1020),
Conveying the signals detected by means of the first sensor group (4.1) to the control unit (12) (S1021),
Stopping the carrying motors (3) by means of the rheostat group by drawing high current from the battery (7) (S1022),
Switching the phase ends of the multistage generator (2) to open circuit position, bringing the carrying motors (3) into contact with the motor linear gears (13) by means of starting the servo/linear motors (14), and stopping the servo/linear motors (14) (S1023).

Carrying motors (3) are ensured to move in the upward direction once again by means of the control unit (12) and the motor drive circuit (9). Upward movement of the mechanism (6) and the process steps repeating as disclosed above runs the system. The inventive system continuously generates energy. There is no need for any external interventions. Moreover, pressing the start button is enough for the initial start-up of the system. Once the start signal is issued, the initial energy is supplied from the battery (7) and the power plant (1) commences operation. An abort button is provided in order to stop the operation of the power plant (1) in cases of maintenance, malfunction or emergencies. The operation of the power plant (1) may be stopped by simply pressing said button.

As the durations for ascending and descending of the mechanism are determined in an alternative embodiment of the present invention, the software may be prepared by considering said durations for ascending and descending and commands for braking, decelerating, moving may be conveyed by means of the software included in the control unit without utilizing any sensors. However, this method is not preferred. Because a synchronization shift may occur after a certain duration of operation. Therefore, the necessary controls should be conducted by at least the first sensor group (4.1) and the fifth sensor group (4.5) in order to ensure the operating safety of the system.

Speed of the carrying motors may be adjusted by changing the PWM value conveyed to the motor drive circuits by means of the software included in the control unit. Thus, the mechanism may complete its movement in the upward direction in a briefer period of time.

Structure of the Single Generator (20)

In an alternative embodiment of the present invention, a single generator (20) may be utilized as an alternative to the multistage generator (2). Aforementioned single generator (20) comprises at least one stator (20.5) and at least two rotors (20.4) each of which is coaxially arranged. Stator (20.5) possesses the feature of rotating just as a rotor (20.4)

can. Said stator (5) rotates in the opposite direction of the rotors (4). The lower cover (20.6) and the upper cover (20.3) protects the stator (20.5) and rotors (20.4) from external factors and ensures that rotors (4) can be fixated. The lower cover (20.6) and the upper cover (20.3) are provided with ball bearing in order to facilitate the rotational movement and to ensure that the shaft moves in a balanced manner.

The stator shaft (20.7) included in the single generator (20) which can be used as an alternative to multistage generator, is connected to the stator (20.5) by passing through the bearing located either on the upper cover (20.3) or on the lower cover (20.6). The single generator stator shaft (20.7) and the single generator rotor shaft (20.13) rotate in opposite directions relatively to one another. The rotor (20.4) positioned on the upper portion is fixed to the upper cover (20.3) while the rotor (20.4) positioned on the lower portion is fixed to the lower cover (20.6). The lower cover (6) and the upper cover (3) are fastened to one another through the screw sockets (20.14) in a manner in which the movement of the stator (5) is not hindered. Thus, the rotors (20.4) which are symmetrical to each other, may move together with both covers.

The stator (20.5) is the portion in which the winding is located, and the energy induction occurs. A single generator phase output (20.2) is provided in order to draw the voltage induced within the stator (20.5). The number of single generator phase outputs (20.2) varies depending on the number of the stators (20.5). Brush (20.8) and slip ring are required for the purpose of drawing the voltage to the external environment since the energy is induced within the stator (20.5). The brush (20.8) and the slip ring (20.9) are positioned on the same axis with the rotor (20.4) and the stator (20.5). Plastic derivative raw materials such as polyurethane, polyester, etc. which are non-conductive and resistant to melting, are utilized instead of pressed siliceous sheet metal plates in order to keep the coils (20.16) that constitute the stator (20.5) together in a uniform shape.

The coil (20.16) is obtained by using varnished copper coil wires or similar conductive coil winding material apart from copper and winding them thereto. More coil wires and magnets (20.15) should be introduced into the available volume to be able to preeminently utilize the annular section of the single generator (20) and to be able to get more power from the same annular volume without upsizing the outer dimensions of the single generator (20). Therefore, the coil (20.16) wires and magnets (20.15) are arranged to be in a trapezoidal shape. A soldering operation is performed, after the process for winding the connections between the coils (20.16) is complete. Subsequent to said soldering operation, tubes are attached to solder joints for insulation purposes. Subsequently, coils (20.16) are varnished once again so as not to give rise to any potential short-circuit. After the varnishing and insulation processes, coils (20.16) are inserted into a mold by using by using one of the plastic derivative raw materials, and preferably polyurethane, polyester, etc. While the molding operation is being performed, it is ensured that coil (20.16) ends remain outside for the single generator phase output (20.2). Said coil (20.16) ends which are left outside, are taken out by providing insulation thereof with tubes. These coil (20.16) ends from which the voltage is drawn, are called single generator phase output (20.2). Single generator phase output (20.2) is taken outside of the single generator (20) by means of the brush (20.8) and slip ring (20.9). Running at high revolution creates sparks in the brush (20.8) and slip ring (20.9). Therefore, the brush (20.8) and the slip ring (20.9) are placed inside a housing (20.11) in order to arrest the formation of sparks. An insulating oil is used within the area of said housing (20.11) in order to arrest the sparks that are formed when the single generator (20) reaches to high rev speeds. Additionally, arcing of sparks between the slip rings (20.9) may also be prevented by using dividers (20.10) between the slip rings (9).

Coil (20.16) wires may be wound to be of a single layer, providing that the wire used for winding is a high gauge wire. Additionally, wires may also be wound to be of multiple layers with a thinner gauge coil (20.16) wire in order to increase the current capacity and to be able to fill the gaps. Herein, coil (20.16) wire ends are turned into a single end by being connected in parallel to each other for each coil (20.16) wire. Subsequently, said ends are taken out based on the desired number of phases by optionally making a star or a delta connection.

Rotor (20.4) is generally the name given to the rotating portion inside the single generator (20). Coils (20.16) that are present in large generators, may also be available in the rotor (20.4). The rotor (20.4) comprises of the magnet (20.15) and the magnet holding plate (20.12). Said magnet holding plate (20.12) is selected from materials that feature a high Gauss value. Thicknesses of the magnet holding plate (20.12) and the magnet (20.15) are equal to each other. In case the thickness of the magnet holding plate (20.12) exceeds the thickness of the magnet (20.15) itself, then accordingly its weight shall increase and impose additional load on the rotor (20.4). In case it is thin, however, the magnetic flux will not be able to flow adequately and accordingly will go into magnetic saturation.

Neodymium series magnets (20.15) are utilized in the rotor (20.4). Thanks to the neodymium series magnets (20.15) utilized in the rotor (20.4) it generates its own magnetic field continuously and begins to generate electrical energy at low numbers of revolution. The magnet holding plate (20.12) comprises magnet cavities (20.17) to which the magnets (20.15) will be inserted. These cavities are smaller than 1 millimeter and they are designed to be thin enough so as not to disable the side polarities of the magnets (20.15). Said cavities are ultrathin recesses that do not expose the magnet (20.15) to any drifting effects stemming from the rotational movement when an adhesive agent is applied thereto and ensures that said magnets (20.15) may be inserted easily. Magnets (20.15) are adherently inserted into said magnet cavities (20.17) which may vary depending on the size of the magnet (20.15) utilized. A special adhesive agent is used for adhering the magnets (20.15). As the distance between the magnets (20.15) becomes shorter, more magnets (20.15) may be inserted into the annular volume, thereby increasing the magnetic field. Furthermore, the number of magnets (20.15) located within the rotors (20.4) which are positioned around each stator (20.5), are equal to each other.

The number of magnets (20.15) located within the rotor (20.4) and the number of coils (20.16) present in the stator (20.5) are determined based on a specific ratio. This ratio is determined to be three coils (20.16) for every four magnets (20.15). This particular ratio removes the risk wherein the electromotor force (EMF) directions which are induced in coils (20.16) by means of the magnetic fields, namely the magnets (20.15), may potentially eliminate each other.

Siliceous sheet metal plates are used in the conventional generator stators. Electromotive force is induced in conductors moving inside the magnetic field. Pursuant thereto, the electromotive force, i.e. a voltage, is induced in siliceous sheet metal plates also. However, said voltage becomes shorted due to aforementioned sheet metal plate and accordingly, nucleus core and thermic losses incur. This causes a decrease in overall efficiency. Plastic derivative materials featuring non-conductivity such as polyurethane, polyester, etc. are used instead of siliceous sheet metal plates in single generators (20) with axial flux. Thus, such losses are prevented.

Single-row magnets (20.15) are used in conventional generators. Hence, it takes a long time for the magnetic flux to complete its path. The magnetic flux that comes out of the rotor (20.4) follows a "U" shaped route and reaches to the end of its path at the adjacent magnet (20.15). As the magnetic flux path becomes longer, efficiency drops. On the other hand, since two rotors (20.4) are utilized in single generators (20) having axial flux, the axial flux which starts from the first rotor (20.4) completes its pathway at the opposite rotor (20.4) after the electromotive force is induced in conductive coil wires located therebetween. Hence, the pathway of the magnetic flux becomes shorter.

In an alternative embodiment of the present invention, nested motors/generators may be used instead of the multistage generator (2), single generator (20) and carrying motors. In said embodiment, be it with nucleus core or not, the motor and the generator may be arranged as a whole. The rotor and the stator of the motor are located inside the inner diameter. The motor which will carry the system upwards by consuming less energy in the inner diameter, comprises stator windings and the rotor portion of the motor. While the motor is running, phase ends of the generator are in open circuit position in electrical terms and run idle since no current is drawn. Said embodiment of the present invention is arranged such that generator windings (23) are positioned on the outer diameter and motor windings (24) are positioned on the inner diameter, and generator magnets (26) are positioned on the outer diameter and motor magnets (25) are positioned on the inner diameter. Aforementioned alternative embodiment is illustrated in FIG. 49 and FIG. 50.

In a further alternative embodiment of the present invention, "Halbach Magnet Array" was used while the magnets of the generator were being arranged. Magnetic field is strengthened by means of said "Halbach Magnet Array". Strengthening the field substantially increases the electrical energy production in electric machines with permanent magnets. Utilizing the strengthening effect through directing the magnetic field area (22) ensures that stator windings remains in the effect of a stronger magnetic field area (22) and a denser electromotive force, i.e. voltage induction occurs in stator winding coils. "Halbach Magnet Array" is illustrated in FIG. 47 and FIG. 48.

The inventive power plant (1) may be used in structures in which a plurality of elevators is utilized, for instance; skyscrapers, hospitals, office blocks and commercial buildings, apartment blocks and mine shafts. Implementation of the inventive power production system in structures in which a plurality of elevators is used, is as follows; said system is integrated to the lower or upper portion or to the side gap of the carrying cabinet along with the elevator. For instance; in case the elevator is not called for 30 seconds, the system is automatically activated by the system software control after checking whether there is any weight on the cabinet floor and any items or living beings are located inside the cabinet or not by means of sensors. The system continues to ascend and descend until the elevator is called. Meanwhile the process of generating energy continues. When the elevator is called to be used, the system that functions for energy production becomes deactivated.

The inventive power plant (1) may further be used in land and maritime transportation means such as cars, buses, trucks and trailer trucks, trains, boats and submarines. A design comprising more than one mechanism (6) has to be created in order for implementing the inventive power plant (1) in aforementioned vehicles. Continuous energy may be obtained by making an instrumentation design in groups of 3, 4 or 6. In case said vehicles do not possess adequate height "h" which is required for the potential energy of the mechanism (6), then the number of said groups may be increased as "h/2, h/3, h/4". The system may be mounted on or installed to the trunk of the car, luggage compartment of a bus or portions at the tail end or sides allocated so as to balance the weight, or between the driver's cabinet and the trailer in trucks and trailer trucks.

In case the inventive power plant (1) is used in aircrafts, spacecrafts, flying automobiles and in transportation vehicles such as boats or in land vehicles that does not approach to the ground with a right angle where angular differences may be present therebetween, the entirety of the system which resembles and elevator is ensured to remain in an upright position relatively to the ground by installing the system into or onto a triaxial gyroscope. Thus, the system continuously operates in a balanced manner and the energy of the vehicles may be supplied.

If the inventive power plant (1) is desired to be used for energy production in spacecrafts or in space stations, artificial gravity is created through any means and disabled periodically as there is no gravity beyond the atmosphere. For instance; if an electromagnet system is created through a setup comprising a coil and a magnet, energy is produced by activating the multistage generator (2) while the elevator system is moving towards the electromagnet attracting the system thereto with the aid of the artificial gravity when energy is supplied to the to the coil in said system. The electromagnet and the multistage generator (2) are deactivated, while the system is moving away from the electromagnet. Accordingly, the carrying motors (3) are activated and the elevator moves away from the electromagnet which attracts it thereto. Once it reaches to the farthest point, electromagnet begins to implement magnetic attraction. The motor/motors accelerate the system in the opposite direction. When the system accelerates, energy production continues by reactivating the multistage generator (2) which is under the effect of the gravitational force. The entire system continues to operate through the period disclosed above.

In recent years, the idea of colonizing other planets and carrying on with space researches in these colonies is frequently brought to the top of the world's agenda. If the present invention is desired to be used on another planet or on a meteorite having gravitational force or in reconnaissance and communications satellites which are usually located within the atmosphere and have gravitational force, it may be used without creating an artificial gravity system after devising a design that is well-proportioned to the gravitational force of the respective planet.

In alternative embodiments of the present invention, lifting systems that are hydraulic or pneumatic, that are provided with an apparatus comprising impellers and chains, spools, belts and pulleys may be used instead of carrying motors.

In a further alternative embodiment of the present invention, energy production may be performed by moving only the rotor or only the stator of the single generator (20) or of the multistage generator (2).

Calculation Pertaining to an Exemplary Embodiment of the Present Invention

While being used for repairing cars, an autolift lifts a 4-ton vehicle with a motor of 4 kW. Approximately a 4-ton mechanism (6) may lift the weight along an apartment instead of a 1.5-2-meter height by means of this motor. Or 4 separate motors with less power may be used instead of a single motor in order to ensure that the system is more balanced. Considering this information, respective exemplary calculation is as follows;

If a permanent-magnet generator with 300 kW power revolves with 170 rpm, then it produces 300 kW of energy. The weight of said generator is 2500 kg. Rated power stated in said product is 300 kW.

This means that 300 kW generator generates 300 kW electricity at 170 rpm. It may generate up to 380 kW as the rev is increased. In higher revolutions, however, windings begin to heat up and accordingly begin to burn out after a certain period of time. The feature of said generator is that it can generate high amounts of energy at low revolution speeds.

170 revs are divided into 2. The rotor is revolved at 85 rpm in one direction, and the stator is revolved at 85 rpm in the other direction by means of the gear wheels, as they fall downwardly with the effect of their own weights in line with the gravity. Resultant rev speed once again equals to 170 rpm.

A 300-kW generator of which rotor and stator rotate in opposite directions to one another, generates a total of 300 kWh (kilowatt-hour) in 1 hour in continuous duty.

In 24 hours (again, in continuous duty): 300 kW×24 hours=7.200 kWh

In 30 days (in continuous duty): 7.200 kWh×30 days=216.000 kWh=216 MWh (216 megawatt-hour)

In 12 months, i.e. in 1 year (in continuous duty): It generates a total of 216 MWh×12 months=2.592 Mwh/year energy.

No energy is generated while the mechanism is performing its movement in the upward direction and while performing its acceleration movement in the downward direction. Energy generation realizes after the acceleration step. Therefore, energy generation is carried out in ⅓ time in average.

The amount of energy generated equals to 2.592.000 (kWh/year)/3=864.000 (kWh/year).

This means that at least 3 of said mechanisms of which respective calculations are made, is required for generating electrical energy continuously. In this case;

the amount of energy generated equals 864.000 (kWh/year)×3=2.592.000 (kWh/year). The point to be taken into consideration herein is that the energy to be generated at 170 rpm by rotating the rotor and the stator in opposite directions is actually generated at 85 rpm. In other words, if it is assumed that there is a 50-meter road, then said generator generates the same energy in 25 meters. Accordingly, it will continue to generate energy for the remaining 25 meters. This means that it will end up generating 2 times more energy. When compared to other generators in which only the rotor or only the stator rotates, 2 times more energy will be generated in the entirety of the descension path by means of the rotation performed in opposite directions. Therefore, the amount generated energy equals;

2×2.592.000 (kWh/year)=5.184.000 (kWh/year).

In a research conducted by TEIAS (Turkish Electricity Transmission Corporation), annual average electrical energy consumption of a family of four with two kids in Turkey was calculated as 3036 kWh. In that case;

Annual electrical energy needs of 5.184.000 (kWh/year)/3.036 (kWh/year)=1.707 residences may be supplied with only 3 of the inventive power plants that generates electricity through gravitational force.

The power of motors required for lifting the weight of 2500 kg of the generator and other systems which are carried in the upward direction in the inventive power plant that generates electricity through gravitational force, is as follows;

Total Weight: 2500 kg

Default lifting speed of the generator and other systems: 0.5 m/s (meter/second)

4 motors are used in order to carry the moving system in the upward direction in a balanced manner. Said motors have impellers with a diameter of 1.20 meters. Power required for lifting up the system:

2500 kg×9.81=24.525 kgm (kilogram-meter) or Newton Meter

Diameter of Motor Impeller: 1.20 m

Circumference of Motor Impeller Diameter=2×π× r=2×3.14×(1.20 m/2)=3.768 m

When said motor impeller revolves one time, it ascends by travelling 3.768 meters.

As the moving mechanism travels at a speed of 0.5 m/s per second; that means it travels 0.5 m/s×60 seconds=30 meters.

Said mechanism travels 30 meters in 1 minute. This means that motor impeller having the diameter of 1.20 meters has to revolve at $$\frac{30 \text{ m/rev}}{3.768 \text{ m}} = 7.961 \text{ rev/min.}$$

(considered as 7.961 ≅ rev/minute 8 rev/minute = 8 rpm

In the calculations provided above, required momentum was calculated as 24.525 Nm. Necessary motor power is calculated as follows;

If; Momentum = Torque =

$$\frac{9,5488 * \text{Power(kW)}}{\text{Speed(rpm)}} = \text{Power} = \frac{8 * 24.525}{9.5488} = 20.547 \text{ Watts} = 20.55 \text{ kW.}$$

As 4 motors are utilized in order to carry the moving system up in a balanced manner, required total motor power is divided into 4. Power of each motor;

is calculated as 20.55 kW/4=5.14 kW.

Consequently, power consumed by 4 motors in one hour is: 20.55 kWh. Meanwhile the power generated by the generator in one hour by taking advantage of the gravitational power is 300 kWh.

In a pulley system which may be used as an alternative to the system of which respective calculations are provided above, 2 times gain will be acquired if a single pulley is utilized. The power required for carrying the moving system up will be divided into 2.

In case a pulley system is used as an alternative method, motors are run in a stationary manner on the ground and pulleys are moved in an integrated manner with gears; in that case;

the respective calculation gives the result of 5.14 kW/2=2.57 kW. In other words, 4 motors of 2.57 kW will be sufficient to lift the system.

Exemplary Tram for Providing a Better Understanding of the Present Invention

In general, trams draw power from a motor of 105 kVA in average. An average tramcar weighs around 50 tons. Said trams are capable of climbing 1000-meter-long hill having a specific incline rate (up to 6-7%). When around 25-30 passengers board a tramcar, the weight increases to 52.5 tons approximately. This change that occurs in the total weight slightly increases the amount of consumed power at the traction motor (CER) of the tram. If it is assumed that the tram consumes 10 units of energy while climbing aforementioned hill, it recovers around 8-8.5 units of energy by means of the gravitational force as the motor switches to the generator mode which is also called motor regeneration mode. This recovered energy is regained only by the traction motor (CER) that moves the tram. Remaining amount of energy is system losses.

Apart from the locomotive of the tramcar, 10 axles which rotate idly at the back side carry only the mass weight of the tramcar. Instead of aforementioned 25-30 passengers, the generator having 10 rotors and stators which weigh 250 kg and rotate in the opposite directions are connected between the axles. Total weight remains as 52.5 tons.

The amount of energy generated by a conventional generator in 1000 meters can be produced in around 125-150 meters along with the losses by means of the generator in which each rotor and stator rotate in opposite directions. Since the total length of the hill is 1000 meters, each generator will continue to generate energy. As each generator will generate 7-8 times more energy, a total of 10 generators will generate approximately 70-80 times more energy.

Phase ends of said generators in which rotors and stators rotate in opposite directions, are in open circuit position while advancing on a straight road as well as while climbing a hill. These are switched to closed circuit position by means of the tilt sensor only when going down a hill. The point disclosed herein relates to utilizing the regeneration method efficiently and taking advantage of the continuous gravitational force.

A power plant having a generator with stator and rotor rotating in opposite directions to one another characterized in that, it comprises; rotor generator linear gear (11*a*) and stator generator linear gear (11*b*) positioned in opposite directions to one another relatively to the generator axis consisting of rotor shaft (18) and stator shaft (19), rotor generator impeller (10*a*) and stator generator impeller (10*b*) that come into contact with said rotor generator linear gear (11*a*) and with said stator generator linear gear (11*b*), and have rotational motion in opposite directions to one another, at least one carrying motor (3) that allows for lifting the mechanism (6) up by means of the motor linear gear (13), sensor groups (4.1, 4.2, 4.3, 4.4, 4.5) that detect the location of the mechanism (6), a battery (7) and/or power supply and/or electricity grid that provides the electrical energy needed by the system, brush-slip ring (21) system and mechanism phase output (17) for drawing out the electricity generated in said generator, a control unit (12) that controls the accelerating, decelerating and stopping actions of said mechanism (6) of which location is detected by means of mechanism phase output (17) and sensor groups (4.1, 4.2, 4.3, 4.4, 4.5) and carrying motor (3) and motor drive circuit (9) that perform said actions.

The invention claimed is:

1. An energy generating system comprising:
    a mechanism having a generator with a stator and a rotor rotating in opposite directions to one another;
    a rotor generator linear gear and a stator generator linear gear positioned in opposite directions to one another relative to a generator axis which is defined by a rotor shaft and a stator shaft;
    a rotor generator impeller and a stator generator impeller that come into contact with the rotor generator linear gear and with the stator generator linear gear, and having rotational motion in opposite directions to one another;
    at least one carrying motor that allows for lifting the mechanism up by means of at least one motor linear gear;
    sensor groups comprising a first, a second, a third, a fourth, and a fifth sensor group configured to detect a position of the mechanism;
    a battery and/or power supply and/or an electricity grid that provides electrical energy needed by the system;
    a brush-slip ring system and a mechanism phase output for drawing out electricity generated in the system; and
    and a control unit that controls acceleration, deceleration and stopping actions of the mechanism by means of the at least one carrying motor and a motor drive circuit.

2. Generator used in the energy generation system according to claim 1, wherein said generator is a coreless and an axial-flux single generator comprising;
    at least one rotor and at least one stator, wherein said stator rotates in the opposite direction of the single generator rotor shaft, and is capable of rotating just like a rotor;
    copper coil wires being wound around a nucleus core made of a non-conducting, melt-resistant, plastic derivative raw material or created by bringing siliceous sheet metal plates together as a pack;
    a lower cover and an upper cover protecting the at least one of the stator and at least one of the rotor from external factors and ensure that the rotor can be fixed; wherein
    the single generator stator shaft that is connected to the at least one stator by passing through a bearing located on the upper cover or the lower cover and that rotates in the opposite direction of the single generator rotor shaft; and
    the brush-slip ring system in order to draw out a generated voltage.

3. The energy generation system according to claim 1, wherein the system comprises a multistage generator.

4. The multistage generator used in the system of claim 3, wherein said multistage generator consists of the at least one rotor and the at least one stator, wherein each stage is positioned relatively to one another with a rotation angle of $2\pi/(s \times p)$ radian and at different angles from one another depending on the number of stages(s) and on the number of phases (p), and wherein said multistage generator comprises a rotor fixing screw and a screw socket which ensure that said rotors included in every stage are fixed to each other, and the multistage generator further comprises a wedge and a keyway which ensure that said stators are fixed to the stator shaft.

5. The energy generation system according to claim 1, wherein the system further comprises at least one spring in order to prevent the mechanism from getting damaged by colliding with an uppermost point of an outer cage or with a base portion thereof.

6. The energy generation system according to claim 1, wherein the system further comprises a servo/linear motor which ensures that the at least one carrying motor is moved away from the at least one motor linear gear in a manner in which said at least one carrying motor does not come into contact with said at least one motor linear gear in order to reduce friction.

7. The energy generation system according to claim 1, wherein the fourth sensor group detects when the mechanism approaches an uppermost point of an outer cage in order to decelerate the at least one carrying motor during an upward movement of the mechanism.

8. The energy generation system according to claim 1, wherein the fifth sensor group detects when the mechanism reaches an uppermost point of an outer cage in order to stop the at least one carrying motor entirely during an upward movement of the mechanism.

9. The energy generation system according to claim 1, wherein the second sensor group detects when the mechanism approaches a lowermost point of an outer cage in order to decelerate the at least one carrying motor during a downward movement of the mechanism.

10. The energy generation system according to claim 1, wherein the first sensor group detects when the mechanism reaches a lowermost point of an outer cage in order to stop the at least one carrying motor entirely during a downward movement of the mechanism.

11. The energy generation system according to claim 1, wherein the third sensor group which detects the mechanism reaches to a $9/14 \times h$ distance of an outer cage from a bottom portion in order to deactivate the at least one carrying motor during a downward movement of the mechanism.

12. The energy generation system according to claim 1, wherein the system further comprises a current limiter for maintaining deceleration at a certain level in the generator or a multistage generator decelerating with an effect of counter electro motive force.

13. The energy generation system according to claim 1, wherein the brush-slip ring system and the mechanism phase output are switched to a closed circuit position in order to draw out electrical energy generated when phase of the generator or a multistage generator ends.

14. The energy generation system according to claim 1, wherein the system further comprises magnets located in both the generator or a multistage generator are arranged in a "Halbach Magnet Array".

15. The energy generation system according to claim 1, wherein the system further comprises a rheostat group that creates a counter electro motive force by drawing required current from generator windings, thereby ensuring that an electromagnetic braking action is performed during a downward movement of the mechanism when said mechanism reaches the second sensor group.

16. The energy generation system according to claim 1, wherein the system possesses at least two mechanisms for continuous energy generation.

17. Operation method of an energy generating system of claim 1 having a generator with the stator and the rotor rotating in opposite direction to one another, the method comprising the process steps of;
   supplying an initial energy from a battery;
   deactivating the first sensor group, the second sensor group and the third sensor group and accordingly activating the fourth sensor group and the fifth sensor group by means of the control unit;
   moving the mechanism in an upward direction by means of the at least one carrying motor;
   controlling the mechanism by means of the fourth sensor group and the control unit, by directing a signal detected by the fourth sensor group to the control unit;
   conveying an instruction of brake for braking the at least one carrying motor to the motor drive circuit by means of the control unit and accordingly decelerating the mechanism;
   detecting the mechanism by means of the fifth sensor group and directing the detected signal to the control unit;
   conveying instructions to stop for the at least one carrying motor to the motor drive circuit by means of the control unit and accordingly stopping the mechanism;
   activating the first sensor group, the second sensor group and the third sensor group, and deactivating the fourth sensor group and the fifth sensor group;
   conveying an instruction to accelerate with a required revolution number for the movement in a downward direction by means of the control unit;
   controlling whether the mechanism has reached a $5/14 \times h$ distance or not by means of the third sensor group;
   directing one or more signals detected by the third sensor group to the control unit;
   starting one or more servo/linear motors through the motor drive circuit by means of the control unit and moving the at least one carrying motor away from the motor linear gears;
   cutting the power of the at least one carrying motor and stopping the at least one carrying motor;
   releasing an accelerated mechanism for a free fall and switching phase ends of a multilevel generator to a closed-circuit position;
   drawing an electrical energy generated by means of the phase ends of the multilevel generator to an external environment and transferring a certain amount of electrical energy to the battery over the control unit;
   stopping a charging process by means of the control unit once a charge of the battery has reached an upper limit;
   controlling the mechanism by means of the second sensor group and the control unit;
   conveying one or more signals detected by means of the second sensor group to the control unit;
   activating a rheostat group gradually by means of the control unit and braking the mechanism softly through a counter electromotive force by drawing a required current;
   conveying one or more signals detected by means of the first sensor group to the control unit;
   stopping the at least one carrying motor by means of the rheostat group by drawing a required current from the battery;
   switching the phase ends of the generator to an open circuit position, bringing the at least one carrying motor into contact with the motor linear gears by means of starting the servo/linear motor and stopping the servo/linear motor.

* * * * *